(12) United States Patent
Azuma

(10) Patent No.: US 12,355,840 B2
(45) Date of Patent: *Jul. 8, 2025

(54) VEHICULAR ARBITRATION SYSTEM

(71) Applicant: TOYOTA JIDOSHA KABUSHIKI KAISHA, Toyota (JP)

(72) Inventor: Kazumutsu Azuma, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,712

(22) Filed: Apr. 19, 2024

(65) Prior Publication Data

US 2024/0267430 A1 Aug. 8, 2024

Related U.S. Application Data

(63) Continuation of application No. 18/074,829, filed on Dec. 5, 2022, now Pat. No. 11,997,166, which is a
(Continued)

(30) Foreign Application Priority Data

Oct. 18, 2018 (JP) .................................. 2018-196515

(51) Int. Cl.
*H04L 67/125* (2022.01)
*B60W 50/00* (2006.01)
*H04L 67/61* (2022.01)

(52) U.S. Cl.
CPC ........... *H04L 67/125* (2013.01); *B60W 50/00* (2013.01); *H04L 67/61* (2022.05); *B60W 2050/0014* (2013.01)

(58) Field of Classification Search
CPC ..... G06F 9/46; G06F 9/48; G06F 9/50; G06F 9/5005; G06F 9/5061; G06F 9/5077;
(Continued)

(56) References Cited

U.S. PATENT DOCUMENTS 5,142,682 A 8/1992 Lemay et al.
5,832,278 A 11/1998 Pham
(Continued)

FOREIGN PATENT DOCUMENTS

CN 1581125 A 2/2005
CN 1891514 A 1/2007
(Continued)

OTHER PUBLICATIONS

Apr. 27, 2022 Office Action issued in U.S. Appl. No. 16/564,197.
(Continued)

*Primary Examiner* — Anthony R Jimenez
(74) *Attorney, Agent, or Firm* — Oliff PLC

(57) ABSTRACT

A vehicular arbitration system includes: a main manager configured to receive one or more requests from a plurality of first application execution units and to determine a request for operating a predetermined on-vehicle device based on the received one or more requests and a predetermined rule; and a plurality of sub-managers respectively configured to arbitrate the request determined by the main manager and a request input from at least one second application execution unit that is different from the plurality of first application execution units and to control the on-vehicle device based on an arbitration result.

6 Claims, 40 Drawing Sheets

Related U.S. Application Data continuation of application No. 16/564,197, filed on Sep. 9, 2019, now Pat. No. 11,570,252.

(58) Field of Classification Search
CPC ........ G06F 9/5083; G06F 9/54; B60W 50/00; B60W 50/0001; B60W 50/0002; B60W 50/0004; B60W 50/0008; B60W 50/0012; B60W 50/0013; B60W 50/0014; B60W 50/0016; B60W 2520/00; B60W 30/00; B60W 30/02; B60W 30/025; B60W 30/06; B60W 30/08; B60W 30/085; B60W 30/09; B60W 30/095; B60W 30/10; B60W 30/12; B60W 30/14; B60W 30/143; B60W 30/146; B60W 30/16; B60W 30/181; B60W 30/182; B60W 30/188; B60W 10/00; B60W 10/30; B60W 20/00; B60W 20/15; B60W 20/19; B60W 20/20; B60W 20/50; B60L 2240/00; B60L 2240/10; B60L 2240/34; B60L 2250/00; B60L 2050/0014; H04L 67/61; H04L 67/125; H04L 67/322; H04L 67/2596; H04L 67/30; H04L 67/3005; H04L 67/301; H04L 67/3015
USPC .......................................... 200/36
See application file for complete search history.

(56) References Cited

U.S. PATENT DOCUMENTS

| | | | | |
|---|---|---|---|---|
| 11,570,252 B2 * | 1/2023 | Azuma | ............ | G06F 9/526 |
| 11,997,166 B2 * | 5/2024 | Azuma | ............ | G06F 9/526 |
| 2005/0268302 A1 | 12/2005 | Geib et al. | | |
| 2007/0004553 A1 | 1/2007 | Oikawa et al. | | |
| 2008/0211654 A1 | 9/2008 | Kasamatsu | | |
| 2008/0288150 A1 | 11/2008 | Isogai et al. | | |
| 2011/0066344 A1 | 3/2011 | Niwa et al. | | |
| 2016/0032851 A1 | 2/2016 | Idogawa | | |

FOREIGN PATENT DOCUMENTS

| | | | |
|---|---|---|---|
| JP | 2002-202891 | A | 7/2002 |
| JP | 2004-262331 | A | 9/2004 |
| JP | 2008-213609 | A | 9/2008 |
| JP | 2008-279983 | A | 11/2008 |
| JP | 2014-177897 | A | 9/2014 |
| JP | 2017-091214 | A | 5/2017 |
| KR | 10-2007-0027613 | A | 3/2007 |
| WO | 2005/119446 | A2 | 12/2005 |
| WO | 2014/140737 | A1 | 9/2014 |

OTHER PUBLICATIONS

Sep. 12, 2022 Notice of Allowance issued in U.S. Appl. No. 16/564,197.
Nov. 30, 2022 Notice of Allowance issued in U.S. Appl. No. 16/564,197.
Apr. 12, 2023, Office Aciton issued in U.S. Appl. No. 18/074,829.
English translation of Apr. 15, 2023 Office Action issued in Chinese Patent Application No. 201910979656.5.
Oct. 10, 2023 Office Action issued in U.S. Appl. No. 18/074,829.
Jan. 24, 2024 Notice of Allowance issued in U.S. Appl. No. 18/074,829.

* cited by examiner

FIG. 4

| | CONTENTS | TYPE | VALUE |
|---|---|---|---|
| SAFE GETTING-OFF SUPPORT ⇔ MAIN MANAGER | SERVICE START/STOP REQUEST | APPLICATION REQUEST | TYPE, START/STOP |
| | D SEAT UNLATCH NON-PERMISSION REQUEST | APPLICATION REQUEST | NON-PERMISSION REQUEST PRESENCE/ABSENCE |
| | P SEAT UNLATCH NON-PERMISSION REQUEST | APPLICATION REQUEST | NON-PERMISSION REQUEST PRESENCE/ABSENCE |
| | RR SEAT UNLATCH NON-PERMISSION REQUEST | APPLICATION REQUEST | NON-PERMISSION REQUEST PRESENCE/ABSENCE |
| | RL SEAT UNLATCH NON-PERMISSION REQUEST | APPLICATION REQUEST | NON-PERMISSION REQUEST PRESENCE/ABSENCE |
| | D SEAT LOCK/UNLOCK STATE | F/B | LOCK/UNLOCK |
| | P SEAT LOCK/UNLOCK STATE | F/B | LOCK/UNLOCK |
| | RR SEAT LOCK/UNLOCK STATE | F/B | LOCK/UNLOCK |
| | RL SEAT LOCK/UNLOCK STATE | F/B | LOCK/UNLOCK |
| IN-VEHICLE CHILD WATCHING (DEVICE OPERATION RESTRICTION) ⇔ MAIN MANAGER | SERVICE START/STOP REQUEST | APPLICATION REQUEST | TYPE, START/STOP |
| | D SEAT UNLATCH NON-PERMISSION REQUEST | APPLICATION REQUEST | NON-PERMISSION REQUEST PRESENCE/ABSENCE |
| | P SEAT UNLATCH NON-PERMISSION REQUEST | APPLICATION REQUEST | NON-PERMISSION REQUEST PRESENCE/ABSENCE |
| | RR SEAT UNLATCH NON-PERMISSION REQUEST | APPLICATION REQUEST | NON-PERMISSION REQUEST PRESENCE/ABSENCE |
| | RL SEAT UNLATCH NON-PERMISSION REQUEST | APPLICATION REQUEST | NON-PERMISSION REQUEST PRESENCE/ABSENCE |
| | D SEAT LOCK/UNLOCK STATE | F/B | LOCK/UNLOCK |
| | P SEAT LOCK/UNLOCK STATE | F/B | LOCK/UNLOCK |
| | RR SEAT LOCK/UNLOCK STATE | F/B | LOCK/UNLOCK |
| | RL SEAT LOCK/UNLOCK STATE | F/B | LOCK/UNLOCK |
| REMOTE PARKING ⇔ MAIN MANAGER | DOOR LOCK REQUEST | APPLICATION REQUEST | LOCK REQUEST PRESENCE/ABSENCE |
| | DOOR UNLOCK REQUEST | APPLICATION REQUEST | UNLOCK REQUEST PRESENCE/ABSENCE |
| | D SEAT COURTESY SWITCH STATE | F/B | OPEN/CLOSED |
| | P SEAT COURTESY SWITCH STATE | F/B | OPEN/CLOSED |
| | RR SEAT COURTESY SWITCH STATE | F/B | OPEN/CLOSED |
| | RL SEAT COURTESY SWITCH STATE | F/B | OPEN/CLOSED |

FIG. 5

| | CONTENTS | TYPE | VALUE |
|---|---|---|---|
| MAIN MANAGER ⇔ LID SUB-MANAGER (DOOR LOCK) | D SEAT UNLATCH NON-PERMISSION REQUEST | REQUEST | NON-PERMISSION REQUEST PRESENCE/ABSENCE |
| | P SEAT UNLATCH NON-PERMISSION REQUEST | REQUEST | NON-PERMISSION REQUEST PRESENCE/ABSENCE |
| | RR SEAT UNLATCH NON-PERMISSION REQUEST | REQUEST | NON-PERMISSION REQUEST PRESENCE/ABSENCE |
| | RL SEAT UNLATCH NON-PERMISSION REQUEST | REQUEST | NON-PERMISSION REQUEST PRESENCE/ABSENCE |
| | REMOTE PARKING DOOR LOCK REQUEST | REQUEST | LOCK REQUEST PRESENCE/ABSENCE |
| | REMOTE PARKING DOOR UNLOCK REQUEST | REQUEST | UNLOCK REQUEST PRESENCE/ABSENCE |
| | D SEAT COURTESY SWITCH STATE | F/B | OPEN/CLOSED |
| | P SEAT COURTESY SWITCH STATE | F/B | OPEN/CLOSED |
| | RR SEAT COURTESY SWITCH STATE | F/B | OPEN/CLOSED |
| | RL SEAT COURTESY SWITCH STATE | F/B | OPEN/CLOSED |
| | D SEAT LOCK/UNLOCK STATE | F/B | LOCK/UNLOCK |
| | P SEAT LOCK/UNLOCK STATE | F/B | LOCK/UNLOCK |
| | RR SEAT LOCK/UNLOCK STATE | F/B | LOCK/UNLOCK |
| | RL SEAT LOCK/UNLOCK STATE | F/B | LOCK/UNLOCK |

FIG. 6

| | CONTENTS | TYPE | VALUE |
|---|---|---|---|
| MAIN MANAGER ⇔ HMI MANAGER | MID DISPLAY REQUEST FROM SAFE GETTING-OFF SUPPORT | REQUEST | DISPLAY CONTENTS |
| | IN-VEHICLE BUZZER SOUNDING REQUEST FROM SAFE GETTING-OFF SUPPORT | REQUEST | BUZZER PRESENCE/ABSENCE |
| | SCREEN DISPLAY REQUEST FROM SAFE GETTING-OFF SUPPORT | REQUEST | DISPLAY CONTENTS |
| | VOICE UTTERANCE REQUEST FROM SAFE GETTING-OFF SUPPORT | REQUEST | UTTERANCE CONTENTS |

FIG. 7

| CONTENTS | | TYPE | VALUE |
|---|---|---|---|
| IN-VEHICLE DEVICE AUTOMATIC CONTROL (VOICE RECOGNITION) ⇔ MAIN MANAGER | SERVICE START/STOP REQUEST | APPLICATION REQUEST | TYPE, START/STOP |
| | P/W OPERATION REQUEST BY VOICE OPERATION | APPLICATION REQUEST | LOCATION, OPEN/CLOSED/STOPPED |
| | P/W OPERABILITY INFORMATION | F/B | PERMISSION/NON-PERMISSION |
| | P/W OPERATION STATE | F/B | START/REJECTION/STOP/TERMINATION |
| DEVICE OPERATION RESERVATION SETTING ⇔ MAIN MANAGER | SERVICE START/STOP REQUEST | APPLICATION REQUEST | TYPE, START/STOP |
| | P/W OPERATION REQUEST BY OPERATION RESERVATION | APPLICATION REQUEST | LOCATION, OPEN/CLOSED/STOPPED |
| | P/W OPERABILITY INFORMATION | F/B | PERMISSION/NON-PERMISSION |
| | P/W OPERATION STATE | F/B | START/REJECTION/STOP/TERMINATION |
| IN-VEHICLE CHILD WATCHING (DEVICE OPERATION RESTRICTION) ⇔ MAIN MANAGER | P/W NON-OPERATION REQUEST AT TIME OF CHILD GETTING-ON | APPLICATION REQUEST | NON-OPERATION REQUEST PRESENCE/ABSENCE |

FIG. 8

| | CONTENTS | TYPE | VALUE |
|---|---|---|---|
| MAIN MANAGER ⇔ LID SUB-MANAGER (P/W) | P/W OPERATION REQUEST | REQUEST | LOCATION, OPEN/CLOSED/STOPPED |
| | P/W PERMISSION SIGNAL REQUEST | REQUEST | ON/OFF |
| | P/W OPERATING STATE | F/B | OPERATION/REVERSAL/STOP |
| | P/W POSITION INFORMATION | F/B | FULLY OPENED/HALFWAY/FULLY CLOSED |

FIG. 9

| | CONTENTS | TYPE | VALUE |
|---|---|---|---|
| MAIN MANAGER ⇔ HMI MANAGER | P/W EMERGENCY STOP SWITCH PRESSING NOTIFICATION | SWITCH INFORMATION | ON (PRESSED) |
| | P/W OPERATION STATE DISPLAY REQUEST | DISPLAY REQUEST | DISPLAY ON/OFF |
| | VOICE NOTIFICATION REQUEST FROM IN-VEHICLE CHILD WATCHING SERVICE | REQUEST | NOTIFICATION CONTENTS |
| | DISPLAY GUIDANCE REQUEST FROM IN-VEHICLE CHILD WATCHING SERVICE | REQUEST | DISPLAY CONTENTS |

FIG. 10

| | CONTENTS | TYPE | VALUE |
|---|---|---|---|
| IN-VEHICLE DEVICE AUTOMATIC CONTROL (VOICE RECOGNITION) ⇔ MAIN MANAGER | SERVICE START/STOP REQUEST | APPLICATION REQUEST | TYPE, START/STOP |
| | S/R OPERATION REQUEST BY VOICE OPERATION | APPLICATION REQUEST | OPEN/CLOSED/STOPPED |
| | S/R OPERABILITY INFORMATION | F/B | PERMISSION/NON-PERMISSION |
| | S/R OPERATION STATE | F/B | START/REJECTION/STOP/TERMINATION |
| DEVICE OPERATION RESERVATION SETTING ⇔ MAIN MANAGER | SERVICE START/STOP REQUEST | APPLICATION REQUEST | TYPE, START/STOP |
| | S/R OPERATION REQUEST BY OPERATION RESERVATION | APPLICATION REQUEST | OPEN/CLOSED/STOPPED |
| | S/R OPERABILITY INFORMATION | F/B | PERMISSION/NON-PERMISSION |
| | S/R OPERATION STATE | F/B | START/REJECTION/STOP/TERMINATION |

FIG. 11

| | CONTENTS | TYPE | VALUE |
|---|---|---|---|
| MAIN MANAGER ⇔ LID SUB-MANAGER (S/R) | S/R OPERATION REQUEST | REQUEST | OPEN/CLOSED/STOPPED |
| | S/R OPERATION STATE | F/B | OPERATION/REVERSAL/STOP |
| | S/R POSITION INFORMATION | F/B | FULLY OPENED/HALFWAY/FULLY CLOSED |

FIG. 12

| | CONTENTS | TYPE | VALUE |
|---|---|---|---|
| MAIN MANAGER ⇔ HMI MANAGER | S/R EMERGENCY STOP SWITCH PRESSING NOTIFICATION | SWITCH INFORMATION | ON (PRESSED) |
| | S/R OPERATION STATE DISPLAY REQUEST | DISPLAY REQUEST | DISPLAY ON/OFF |

FIG. 13

| | CONTENTS | TYPE | VALUE |
|---|---|---|---|
| REMOTE PARKING ⇔ MAIN MANAGER | VEHICLE WITHDRAWAL: FORWARD/BACKWARD MOVEMENT CONTROL START INSTRUCTION | INSTRUCTION | OFF/ON |
| | VEHICLE WITHDRAWAL: FORWARD/BACKWARD MOVEMENT CONTROL START NOTIFICATION | NOTIFICATION | OFF/ON |
| | VEHICLE WITHDRAWAL: FORWARD/BACKWARD CONTROL WITHDRAWAL COMPLETION NOTIFICATION | NOTIFICATION | OFF/ON |
| | VEHICLE STORAGE: FORWARD/BACKWARD MOVEMENT CONTROL START INSTRUCTION | INSTRUCTION | OFF/ON |
| | VEHICLE STORAGE: FORWARD/BACKWARD MOVEMENT CONTROL START CONDITION CONFIRMATION NOTIFICATION | NOTIFICATION | OFF/ON |
| | VEHICLE STORAGE: FORWARD/BACKWARD MOVEMENT CONTROL START NOTIFICATION | NOTIFICATION | OFF/ON |
| | VEHICLE STORAGE: FORWARD/BACKWARD MOVEMENT CONTROL STORAGE COMPLETION NOTIFICATION | NOTIFICATION | OFF/ON |
| | REMOTE PARKING STATE | STATE INFORMATION | START/WAIT/END |
| | VEHICLE STORAGE: FORWARD/BACKWARD MOVEMENT CONTROL START COMPLETION NOTIFICATION | F/B | OFF/ON |
| | VEHICLE STORAGE: FORWARD/BACKWARD MOVEMENT CONTROL DRIVER GETTING-OFF COMPLETION NOTIFICATION | F/B | OFF/ON |
| | VEHICLE STORAGE: FORWARD/BACKWARD MOVEMENT CONTROL START CONDITION RESPONSE NOTIFICATION | F/B | OFF/ON |
| | VEHICLE STORAGE: FORWARD/BACKWARD MOVEMENT CONTROL START RESPONSE NOTIFICATION | F/B | OFF/ON |
| | VEHICLE STORAGE: FORWARD/BACKWARD MOVEMENT CONTROL STORAGE COMPLETION RESPONSE NOTIFICATION | F/B | OFF/ON |
| AUTOMATIC DRIVING ⇒ MAIN MANAGER | AUTOMATIC DRIVING LIGHT AUTO SETTING REQUEST | APPLICATION REQUEST | OFF/ON |
| MAIN MANAGER ⇒ VEHICLE SYSTEM | REMOTE PARKING RESERVATION SWITCH TURNING-OFF NOTIFICATION | NOTIFICATION | OFF/ON |

FIG. 14

| | CONTENTS | TYPE | VALUE |
|---|---|---|---|
| MAIN MANAGER ⇒ LIGHT SUB-MANAGER (FR LAMP) | HEADLIGHT LIGHTING/LIGHTING-OFF REQUEST | REQUEST | LIGHTING/LIGHTING-OFF |
| | AUTOMATIC DRIVING MODE | NOTIFICATION | OFF/ON |
| | LIGHT AUTO MODE SWITCHING REQUEST | REQUEST | OFF/ON |

FIG. 15

| | CONTENTS | TYPE | VALUE |
|---|---|---|---|
| REMOTE PARKING ⇔ MAIN MANAGER | VEHICLE WITHDRAWAL: FORWARD/BACKWARD MOVEMENT CONTROL START INSTRUCTION | INSTRUCTION | OFF/ON |
| | VEHICLE WITHDRAWAL: FORWARD/BACKWARD MOVEMENT CONTROL START NOTIFICATION | NOTIFICATION | OFF/ON |
| | VEHICLE WITHDRAWAL: FORWARD/BACKWARD MOVEMENT CONTROL WITHDRAWAL COMPLETION NOTIFICATION | NOTIFICATION | OFF/ON |
| | VEHICLE STORAGE: FORWARD/BACKWARD MOVEMENT CONTROL START INSTRUCTION | INSTRUCTION | OFF/ON |
| | VEHICLE STORAGE: FORWARD/BACKWARD MOVEMENT CONTROL START CONDITION CONFIRMATION NOTIFICATION | NOTIFICATION | OFF/ON |
| | VEHICLE STORAGE: FORWARD/BACKWARD MOVEMENT CONTROL START NOTIFICATION | NOTIFICATION | OFF/ON |
| | VEHICLE STORAGE: FORWARD/BACKWARD MOVEMENT CONTROL STORAGE COMPLETION NOTIFICATION | NOTIFICATION | OFF/ON |
| | REMOTE PARKING STATE | STATE INFORMATION | START/WAIT/END |
| | VEHICLE STORAGE: FORWARD/BACKWARD MOVEMENT CONTROL START COMPLETION NOTIFICATION | F/B | OFF/ON |
| | VEHICLE STORAGE: FORWARD/BACKWARD MOVEMENT CONTROL DRIVER GETTING-OFF COMPLETION NOTIFICATION | F/B | OFF/ON |
| | VEHICLE STORAGE: FORWARD/BACKWARD MOVEMENT CONTROL START CONDITION RESPONSE NOTIFICATION | F/B | OFF/ON |
| | VEHICLE STORAGE: FORWARD/BACKWARD MOVEMENT CONTROL START RESPONSE NOTIFICATION | F/B | OFF/ON |
| | VEHICLE STORAGE: FORWARD/BACKWARD MOVEMENT CONTROL STORAGE COMPLETION RESPONSE NOTIFICATION | F/B | OFF/ON |
| AUTOMATIC DRIVING ⇒ MAIN MANAGER | AUTOMATIC DRIVING LANE CHANGE RIGHT/LEFT TURN REQUEST | APPLICATION REQUEST | OFF/ON |
| | AUTOMATIC DRIVING RIGHT/LEFT TURNING RIGHT/LEFT TURN REQUEST | APPLICATION REQUEST | OFF/ON |
| IN-VEHICLE CHILD WATCHING (REAR SEAT LEAVING-ALONE NOTIFICATION) ⇒ MAIN MANAGER | LEAVING-ALONE PREVENTION HAZARD BLINKING REQUEST | APPLICATION REQUEST | OFF/ON |
| MAIN MANAGER ⇒ VEHICLE SYSTEM | REMOTE PARKING RESERVATION SWITCH TURNING-OFF NOTIFICATION | NOTIFICATION | OFF/ON |

FIG. 16

| CONTENTS | | TYPE | VALUE |
|---|---|---|---|
| MAIN MANAGER ⇒ LIGHT SUB-MANAGER (TURN HAZARD) | FLASHER BLINKING REQUEST | REQUEST | ABSENCE/HAZARD BLINKING |
| | RIGHT/LEFT TURN BLINKING REQUEST (LANE CHANGE) | REQUEST | ABSENCE/RIGHT BLINKING X TIMES/LEFT BLINKING X TIMES |
| | RIGHT/LEFT TURN BLINKING REQUEST (RIGHT OR LEFT TURNING) | REQUEST | ABSENCE/RIGHT BLINKING/LEFT BLINKING |

FIG. 17

| CONTENTS | | TYPE | VALUE |
|---|---|---|---|
| IN-VEHICLE DEVICE AUTOMATIC CONTROL (VOICE RECOGNITION) ⇒ MAIN MANAGER | SERVICE START/STOP REQUEST | APPLICATION REQUEST | TYPE, START/STOP |
| | ILLUMINATION LIGHTING/LIGHTING-OFF REQUEST | APPLICATION REQUEST | AREA, LIGHTING/SWITCHING/ LIGHTING-OFF |
| IN-VEHICLE DEVICE AUTOMATIC CONTROL (ACTION RECOGNITION) ⇒ MAIN MANAGER | SERVICE START/STOP REQUEST | APPLICATION REQUEST | TYPE, START/STOP |
| | ILLUMINATION LIGHTING/LIGHTING-OFF REQUEST | APPLICATION REQUEST | AREA, LIGHTING/SWITCHING/ LIGHTING-OFF |

FIG. 18

| | CONTENTS | TYPE | VALUE |
|---|---|---|---|
| MAIN MANAGER ⇔ ILLUMINATION SUB-MANAGER (INDOOR ILLUMINATION) | ILLUMINATION LIGHTING/ LIGHTING-OFF REQUEST | REQUEST | PRESENCE/ABSENCE, TARGET, REACHED BRIGHTNESS, CONTROL PATTERN, TIME |
| | ILLUMINATION LIGHTING/ LIGHTING-OFF STATE | F/B | OK/NG |

FIG. 19

| | CONTENTS | TYPE | VALUE |
|---|---|---|---|
| MAIN MANAGER ⇔ HMI MANAGER | ILLUMINATION LIGHTING STATE DISPLAY REQUEST | DISPLAY REQUEST | DISPLAY ON/OFF |
| | DISPLAY STOP REQUEST | DISPLAY REQUEST | DISPLAY OFF |

FIG. 20

| | CONTENTS | TYPE | VALUE |
|---|---|---|---|
| PERSONAL SETTING AUTOMATIC CONTROL ⇔ MAIN MANAGER | PERSONALLY-SET DRIVING POSITION SETTING VALUE REQUEST | APPLICATION REQUEST | SET VALUE (SEAT, TILT/TELESCOPIC, MIRROR) |
| | PRE-GETTING-ON DRIVING POSITION AUTOMATIC ADJUSTMENT START REQUEST | APPLICATION REQUEST | REQUEST PRESENCE/ABSENCE |
| | POST-GETTING-ON DRIVING POSITION AUTOMATIC ADJUSTMENT START REQUEST | APPLICATION REQUEST | REQUEST PRESENCE/ABSENCE |
| | DRIVING POSITION AUTOMATIC ADJUSTMENT START REQUEST AT TIME OF SWITCHING AUTOMATIC DRIVING/MANUAL DRIVING | APPLICATION REQUEST | REQUEST PRESENCE/ABSENCE |
| | PERSONALLY-SET DRIVING POSITION REPRODUCTION END RESPONSE | F/B | END |
| | DRIVING POSITION POSITIONAL INFORMATION RESPONSE | F/B | POSITIONAL INFORMATION (SEAT, TILT/TELESCOPIC, MIRROR) |
| REMOTE PARKING ⇔ MAIN MANAGER | CONTROL MODE SETTING REQUEST AT TIME OF REMOTE PARKING | APPLICATION REQUEST | REMOTE PARKING START/END |
| | SEAT CONTROL MODE SETTING REQUEST | APPLICATION REQUEST | RELAXATION MODE, SEAT FULL FLAT MODE |
| AUTOMATIC DRIVING ⇔ MAIN MANAGER | CONTROL MODE SETTING REQUEST AT TIME OF AUTOMATIC DRIVING | APPLICATION REQUEST | AUTOMATIC DRIVING START/END |
| | SEAT CONTROL MODE SETTING REQUEST | APPLICATION REQUEST | RELAXATION MODE, SEAT FULL FLAT MODE |
| IN-VEHICLE CHILD WATCHING (DEVICE OPERATION RESTRICTION) ⇔ MAIN MANAGER | SEAT OPERATION INHIBITION REQUEST | APPLICATION REQUEST | SEAT TYPE, REQUEST PRESENCE/ABSENCE |

FIG. 21

| | CONTENTS | TYPE | VALUE |
|---|---|---|---|
| MAIN MANAGER ⇔ DRIVING POSITION SUB-MANAGER (SEAT) | DRIVING POSITION SETTING VALUE REQUEST | REQUEST | SET VALUE (SEAT, TILT/TELESCOPIC, MIRROR) |
| | DRIVING POSITION AUTOMATIC ADJUSTMENT START REQUEST | REQUEST | REQUEST PRESENCE/ABSENCE |
| | DRIVING POSITION AUTOMATIC ADJUSTMENT STOP REQUEST | REQUEST | REQUEST PRESENCE/ABSENCE |
| | DRIVING POSITION STORAGE REQUEST | REQUEST | REQUEST PRESENCE/ABSENCE |
| | SEAT CONTROL MODE SETTING REQUEST AT TIME OF AUTOMATIC DRIVING | REQUEST | OFF/ON |
| | SIDE MIRROR FOLDING REQUEST | REQUEST | FOLDING/UNFOLDING |
| | SEAT CONTROL MODE SETTING REQUEST | REQUEST | RELAXATION MODE, SEAT FULL FLAT MODE, SUPPORT |
| | SEAT OPERATION INHIBITION REQUEST | REQUEST | REQUEST PRESENCE/ABSENCE |
| | PNEUMATIC REFRESH REQUEST | REQUEST | REQUEST PRESENCE/ABSENCE |
| | DRIVING POSITION REPRODUCTION END NOTIFICATION | F/B | END |

FIG. 22

| MAIN MANAGER ⇔ HMI MANAGER | CONTENTS | TYPE | VALUE |
|---|---|---|---|
| | DRIVING POSITION EMERGENCY STOP SWITCH PRESSING NOTIFICATION | SWITCH INFORMATION | ON (PRESSED) |
| | VOICE NOTIFICATION REQUEST FROM IN-VEHICLE CHILD WATCHING SERVICE | REQUEST | NOTIFICATION CONTENTS |
| | DISPLAY GUIDANCE REQUEST FROM IN-VEHICLE CHILD WATCHING SERVICE | REQUEST | DISPLAY CONTENTS |

FIG. 23

| | CONTENTS | TYPE | VALUE |
|---|---|---|---|
| REMOTE PARKING ⇔ MAIN MANAGER | VEHICLE WITHDRAWAL: FORWARD/BACKWARD MOVEMENT CONTROL START INSTRUCTION | INSTRUCTION | OFF/ON |
| | VEHICLE WITHDRAWAL: FORWARD/BACKWARD MOVEMENT CONTROL START NOTIFICATION | NOTIFICATION | OFF/ON |
| | VEHICLE WITHDRAWAL: FORWARD/BACKWARD MOVEMENT CONTROL WITHDRAWAL COMPLETION NOTIFICATION | NOTIFICATION | OFF/ON |
| | VEHICLE STORAGE: FORWARD/BACKWARD MOVEMENT CONTROL START INSTRUCTION | INSTRUCTION | OFF/ON |
| | VEHICLE STORAGE: FORWARD/BACKWARD MOVEMENT CONTROL START CONDITION CONFIRMATION NOTIFICATION | NOTIFICATION | OFF/ON |
| | VEHICLE STORAGE: FORWARD/BACKWARD MOVEMENT CONTROL START NOTIFICATION | NOTIFICATION | OFF/ON |
| | VEHICLE STORAGE: FORWARD/BACKWARD MOVEMENT CONTROL STORAGE COMPLETION NOTIFICATION | NOTIFICATION | OFF/ON |
| | REMOTE PARKING STATE | STATE INFORMATION | START/WAIT/END |
| | VEHICLE STORAGE: FORWARD/BACKWARD MOVEMENT CONTROL START COMPLETION NOTIFICATION | F/B | OFF/ON |
| | VEHICLE STORAGE: FORWARD/BACKWARD MOVEMENT CONTROL DRIVER GETTING-OFF COMPLETION NOTIFICATION | F/B | OFF/ON |
| | VEHICLE STORAGE: FORWARD/BACKWARD MOVEMENT CONTROL START CONDITION RESPONSE NOTIFICATION | F/B | OFF/ON |
| | VEHICLE STORAGE: FORWARD/BACKWARD MOVEMENT CONTROL START RESPONSE NOTIFICATION | F/B | OFF/ON |
| | VEHICLE STORAGE: FORWARD/BACKWARD MOVEMENT CONTROL STORAGE COMPLETION RESPONSE NOTIFICATION | F/B | OFF/ON |
| AUTOMATIC DRIVING ⇒ MAIN MANAGER | AUTOMATIC DRIVING WIPER AUTO SETTING REQUEST | APPLICATION REQUEST | OFF/ON |
| MAIN MANAGER ⇒ VEHICLE SYSTEM | REMOTE PARKING RESERVATION SWITCH TURNING-OFF NOTIFICATION | NOTIFICATION | OFF/ON |

FIG. 24

| | CONTENTS | TYPE | VALUE |
|---|---|---|---|
| MAIN MANAGER ⇒ WIPER SUB-MANAGER (FR WIPER WASHER) | WIPER AUTO MODE SWITCHING REQUEST | REQUEST | REQUEST PRESENCE/ABSENCE |
| | AUTOMATIC DRIVING MODE | NOTIFICATION | OFF/ON |

FIG. 25

| SUB-MANAGER (FUNCTION) | CONTENTS | TYPE | VALUE |
|---|---|---|---|
| AUTOMATIC DRIVING ⇔ MAIN MANAGER | HORN SOUNDING REQUEST BY DEAD MAN DETECTION | APPLICATION REQUEST | REQUEST PRESENCE/ABSENCE |

FIG. 26

| MAIN MANAGER ⇔ ALARM SUB-MANAGER | CONTENTS | TYPE | VALUE |
|---|---|---|---|
| | HORN SOUNDING/STOP REQUEST | REQUEST | SOUNDING/STOP |

FIG. 27

| SUB-MANAGER (FUNCTION) | CONTENTS | TYPE | VALUE |
|---|---|---|---|
| IN-VEHICLE CHILD WATCHING (REAR SEAT LEAVING-ALONE NOTIFICATION) ⇔ MAIN MANAGER | WIRELESS BUZZER SOUNDING REQUEST | APPLICATION REQUEST | REQUEST PRESENCE/ ABSENCE |

FIG. 28

| CONTENTS | | TYPE | VALUE |
|---|---|---|---|
| MAIN MANAGER ⇔ ALARM SUB-MANAGER | WIRELESS BUZZER SOUNDING REQUEST | REQUEST | REQUEST PRESENCE/ABSENCE |

FIG. 31

<AREA CONTROL TARGET CONVERSION TABLE>

| AREA | CONTROL TARGET |
|---|---|
| A | Fr DOME, FL SEAT MAP LAMP |
| B | Rr DOME, RL SEAT MAP LAMP |
| D | Fr DOME, FR SEAT MAP LAMP |
| ... | ... |
| J | OUTSIDE HANDLE ILLUMINATION |
| K | – |
| L | – |

FIG. 32

<LIGHTING REQUEST LEVEL CONVERSION TABLE>

| EACH AREA/EACH CONTROL TARGET LIGHTING REQUEST | LIGHTING REQUEST |
|---|---|
| 000b: LIGHTING REQUEST ABSENCE | 000b: REQUEST ABSENCE |
| 001b: ILLUMINATE DARK | 010b: LIGHTING (BRIGHTNESS LEVEL 2) |
| 101b: ILLUMINATE BRIGHT | 100b: LIGHTING (BRIGHTNESS LEVEL 4) |
| ... | ... |

FIG. 33

<FADE CURVE CONVERSION TABLE>

| SERVICE ID | FADE CURVE |
|---|---|
| 0000b: ILLUMINATING HAND | 00b: NORMAL |
| 0001b: HAND CHASE | 01b: SLOWLY |
| 0010b: ILLUMINATING HERE | 10b: FAST |
| ... | ... |

FIG. 34

<PRIORITY CONVERSION TABLE>

| SERVICE ID | PRIORITY |
|---|---|
| 0000b: ILLUMINATING HAND | 0b: NORMAL (PRIORITY 3) |
| 0001b: HAND CHASE | 0b: NORMAL (PRIORITY 3) |
| 0010b: ILLUMINATING HERE | 0b: NORMAL (PRIORITY 3) |
| ... | ... |

FIG. 35

<EQUIPPING INFORMATION/ACCEPTABILITY STATE MATRIX (ILLUMINATION)>

|  |  | EQUIPPING OR NON-EQUIPPING | ACCEPTABILITY |
|---|---|---|---|
| AREA A | LIGHTING REQUEST | EQUIPPED | ACCEPTABLE |
|  | LIGHTING INHIBITION REQUEST | EQUIPPED | ACCEPTABLE |
| ... | ... | ... | ... |
| AREA L | LIGHTING REQUEST | EQUIPPED | ACCEPTABLE |
|  | LIGHTING INHIBITION REQUEST | EQUIPPED | ACCEPTABLE |
| Fr DOME | LIGHTING REQUEST | EQUIPPED | ACCEPTABLE |
|  | LIGHTING INHIBITION REQUEST | EQUIPPED | ACCEPTABLE |
| ... | ... | ... | ... |
| OUTSIDE HANDLE | LIGHTING REQUEST | EQUIPPED | ACCEPTABLE |
|  | LIGHTING INHIBITION REQUEST | EQUIPPED | ACCEPTABLE |

FIG. 36

<EQUIPPING INFORMATION/ACCEPTABILITY STATE MATRIX (ILLUMINATION)>

| | | EQUIPPING INFORMATION | ACCEPTABILITY STATE |
|---|---|---|---|
| Fr DOME | LIGHTING REQUEST | EQUIPPED | ACCEPTABLE |
| | LIGHTING INHIBITION REQUEST | EQUIPPED | ACCEPTABLE |
| FL SEAT MAP LAMP | LIGHTING REQUEST | EQUIPPED | ACCEPTABLE |
| | LIGHTING INHIBITION REQUEST | EQUIPPED | ACCEPTABLE |
| ... | ... | ... | ... |
| OUTSIDE HANDLE | LIGHTING REQUEST | EQUIPPED | ACCEPTABLE |
| | LIGHTING INHIBITION REQUEST | EQUIPPED | ACCEPTABLE |

ILLUMINATION LIGHTING REQUEST

HAND CHASE PRIORITY 3 (HIGH: 1 TO LOW: 5)

| REQUIRED LEVEL (◎: ABSOLUTE, ○: RECOMMENDED, -: NO REQUEST) |
|---|
| ◎ |
| - |
| ◎ |
| - |
| ... |
| - |
| |

FIG. 37

| SYSTEM | ACT | SUB-MANAGER REQUEST | REQUEST GROUPING | EQUIPPING INFORMATION | ACCEPTABILITY STATE | ACTION RECOGNITION REQUEST A PRIORITY 3 | AUTOMATIC DRIVING REQUEST B PRIORITY 1 | LANE KEEPING REQUEST C PRIORITY 2 | DEVICE OPERATION RESTRICTION REQUEST D PRIORITY 4 | VOICE RECOGNITION REQUEST E PRIORITY 4 |
|---|---|---|---|---|---|---|---|---|---|---|
| ILLUMINATION | Fr DOME | LIGHTING REQUEST | ILL-1 | EQUIPPED | ACCEPTABLE | ◎ | | | | |
| | | LIGHTING INHIBITION REQUEST | ILL-1 | EQUIPPED | ACCEPTABLE | | | | ○ | |
| | FL SEAT MAP LAMP | LIGHTING REQUEST | ILL-2 | EQUIPPED | ACCEPTABLE | ◎ | | | | |
| | | LIGHTING INHIBITION REQUEST | ILL-2 | EQUIPPED | ACCEPTABLE | | | | ○ | |
| | ... | ... | ... | ... | ... | ... | ... | ... | ... | ... |
| WIPER | FRONT WIPER | FRONT WIPER WIPING REQUEST | WIP-1 | EQUIPPED | ACCEPTABLE | | ◎ | ◎ | | |
| | REAR WIPER | REAR WIPER WIPING REQUEST | WIP-2 | EQUIPPED | ACCEPTABLE | | | ○ | | |
| | FRONT WASHER | FRONT CLEANING REQUEST | WIP-3 | EQUIPPED | ACCEPTABLE | | ◎ | | | |
| | | FRONT CLEANING INHIBITION REQUEST | WIP-3 | EQUIPPED | ACCEPTABLE | | | | ◎ | |
| | ... | ... | ... | ... | ... | ... | ... | ... | ... | ... |
| DOOR LOCK | DOOR LOCK | DOOR LOCK REQUEST | DLK-1 | EQUIPPED | ACCEPTABLE | | ◎ | | | |
| | | DOOR UNLOCK REQUEST | DLK-1 | EQUIPPED | ACCEPTABLE | | | | | ◎ |
| | ... | ... | ... | ... | ... | ... | ... | ... | ... | ... |

VEHICULAR ARBITRATION SYSTEM

INCORPORATION BY REFERENCE

The present application is a continuation of U.S. patent application Ser. No. 18/074,829, filed on Dec. 5, 2022, which is a continuation of U.S. patent application Ser. No. 16/564,197, filed on Sep. 9, 2019, which claims benefit of priority to Japanese Patent Application No. 2018-196515, filed on Oct. 18, 2018. The contents of these applications are incorporated herein by reference in their entirety.

BACKGROUND

1. Technical Field

The disclosure relates to an arbitration system mounted on a vehicle.

2. Description of Related Art

In recent years, along with development of vehicle technology, applications for implementing functions (services), such as automatic driving and automatic parking, are increasingly mounted on a vehicle. As the number of applications mounted on a vehicle increases, the number of control requests transmitted from the respective applications to respective in-vehicle devices (an actuator, an ECU, and the like) correspondingly increases, whereby vehicle control becomes complicated. For this reason, there has been proposed a control method in which an arbitration device arbitrates a plurality of requests generated from the respective applications and outputs instructions to the respective in-vehicle devices based on a result of the arbitration. For example, Japanese Unexamined Patent Application Publication No. 2002-202891 (JP 2002-202891 A) discloses an electronic control device that integrally arbitrates a plurality of requests for controlling body-based devices of a vehicle so that no contradiction occurs due to the order of execution of processes.

SUMMARY

In JP 2002-202891 A, one electronic control device receives and arbitrates requests from existing applications standardly mounted on a vehicle as well as, for example, requests from new applications additionally mounted on the vehicle. Therefore, each time when a new application is additionally mounted, it is necessary to totally review not only the arbitration rules for a plurality of requests generated by the new application but also the arbitration rules for a plurality of requests generated between the existing application and the new application. Thus, it is not easy to add a new application to expand a function (service).

The disclosure provides a vehicular arbitration system capable of easily performing addition of an application and expansion of a function (service).

An aspect of the disclosure relates to a vehicular arbitration system including: a main manager configured to receive one or more requests from a plurality of first application execution units and to determine a request for operating a predetermined on-vehicle device based on the received one or more requests and a predetermined rule; and a plurality of sub-managers respectively configured to arbitrate the request determined by the main manager and a request input from at least one second application execution unit different from the first application execution units and to control the on-vehicle device based on an arbitration result.

According to the above aspect of the vehicular arbitration system, it is possible to easily perform addition of an application and expansion of a function (service).

According to the above aspect, the plurality of sub-managers may be configured to feed information including a state of the on-vehicle device configured to be managed by each of the plurality of sub-managers back to the main manager; and the main manager may be configured to determine the request for operating the on-vehicle device based on the information fed back from the plurality of sub-managers.

According to the above aspect, the information may include a current operation status of the on-vehicle device operated by the plurality of sub-managers, equipping or non-equipping of the on-vehicle device configured to be managed by the plurality of sub-managers, and acceptability or non-acceptability of an operation by the equipped on-vehicle device.

According to the above aspect, the main manager may be configured, when the main manager receives a plurality of requests from the plurality of first application execution units, to determine the request for operating the on-vehicle device based on priorities given to the plurality of requests.

According to the above aspect, the main manager may be configured, when the main manager receives a plurality of mutually exclusive requests from the plurality of first application execution units, to determine the request for operating the on-vehicle device according to priorities given to the plurality of the mutually exclusive requests.

According to the above aspect, the main manager may be configured to specify a level representing a control amount of the on-vehicle device for realizing the request, based on the requests received from the plurality of first application execution units.

According to the above aspect, the main manager may be configured, when the main manager receives a plurality of requests for the same on-vehicle device from the plurality of first application execution units, to specify a level representing a control amount of the on-vehicle device for covering and realizing the plurality of requests.

According to the above aspect, the main manager may be incorporated in the same electronic control device as the plurality of sub-managers.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing an example of requests and information used in door lock control;

FIG. 5 is a diagram showing an example of requests and information used in door lock control;

FIG. 6 is a diagram showing an example of requests and information used in door lock control;

FIG. 7 is a diagram showing an example of requests and information used in P/W control;

FIG. 8 is a diagram showing an example of requests and information used in P/W control;

FIG. 9 is a diagram showing an example of requests and information used in P/W control;

FIG. 10 is a diagram showing an example of requests and information used in S/R control;

FIG. 11 is a diagram showing an example of requests and information used in S/R control;

FIG. 12 is a diagram showing an example of requests and information used in S/R control;

FIG. 13 is a diagram showing an example of requests and information used in Fr lamp control;

FIG. 14 is a diagram showing an example of requests and information used in Fr lamp control;

FIG. 15 is a diagram showing an example of requests and information used in turn hazard control;

FIG. 16 is a diagram showing an example of requests and information used in turn hazard control;

FIG. 17 is a diagram showing an example of requests and information used in indoor illumination control;

FIG. 18 is a diagram showing an example of requests and information used in indoor illumination control;

FIG. 19 is a diagram showing an example of requests and information used in indoor illumination control;

FIG. 20 is a diagram showing an example of requests and information used in driving position control;

FIG. 21 is a diagram showing an example of requests and information used in driving position control;

FIG. 22 is a diagram showing an example of requests and information used in driving position control;

FIG. 23 is a diagram showing an example of requests and information used in Fr wiper control;

FIG. 24 is a diagram showing an example of requests and information used in Fr wiper control;

FIG. 25 is a diagram showing an example of requests and information used in alarm control;

FIG. 26 is a diagram showing an example of requests and information used in alarm control;

FIG. 27 is a diagram showing an example of requests and information used in wireless buzzer control;

FIG. 28 is a diagram showing an example of requests and information used in wireless buzzer control;

FIG. 31 is a diagram showing an example of an area control target conversion table possessed by the main manager;

FIG. 32 is a diagram showing an example of a lighting request level conversion table possessed by the main manager;

FIG. 33 is a diagram showing an example of a fade curve conversion table possessed by the main manager;

FIG. 34 is a diagram showing an example of a priority conversion table possessed by the main manager;

FIG. 35 is a diagram showing an example of information fed back to the main manager from the sub-manager;

FIG. 36 is a diagram explaining a process performed by the main manager;

FIG. 37 is a diagram explaining a process performed by the main manager; and

DETAILED DESCRIPTION OF EMBODIMENTS

Embodiments

A vehicular arbitration system according to the disclosure has a two-step processing structure that includes: a main manager configured to receive an abstract request from an application for realizing a new function (service) and to determine a specific request; and a sub-manager configured to arbitrate a request from an application for realizing an existing function and the specific request determined by the main manager. With this structure, it is only necessary to add a new function to the main manager, whereby expandability of functions (services) is improved. Hereinafter, an embodiment of the disclosure will be described in detail with reference to the drawings.

Configurations

Figure 1:
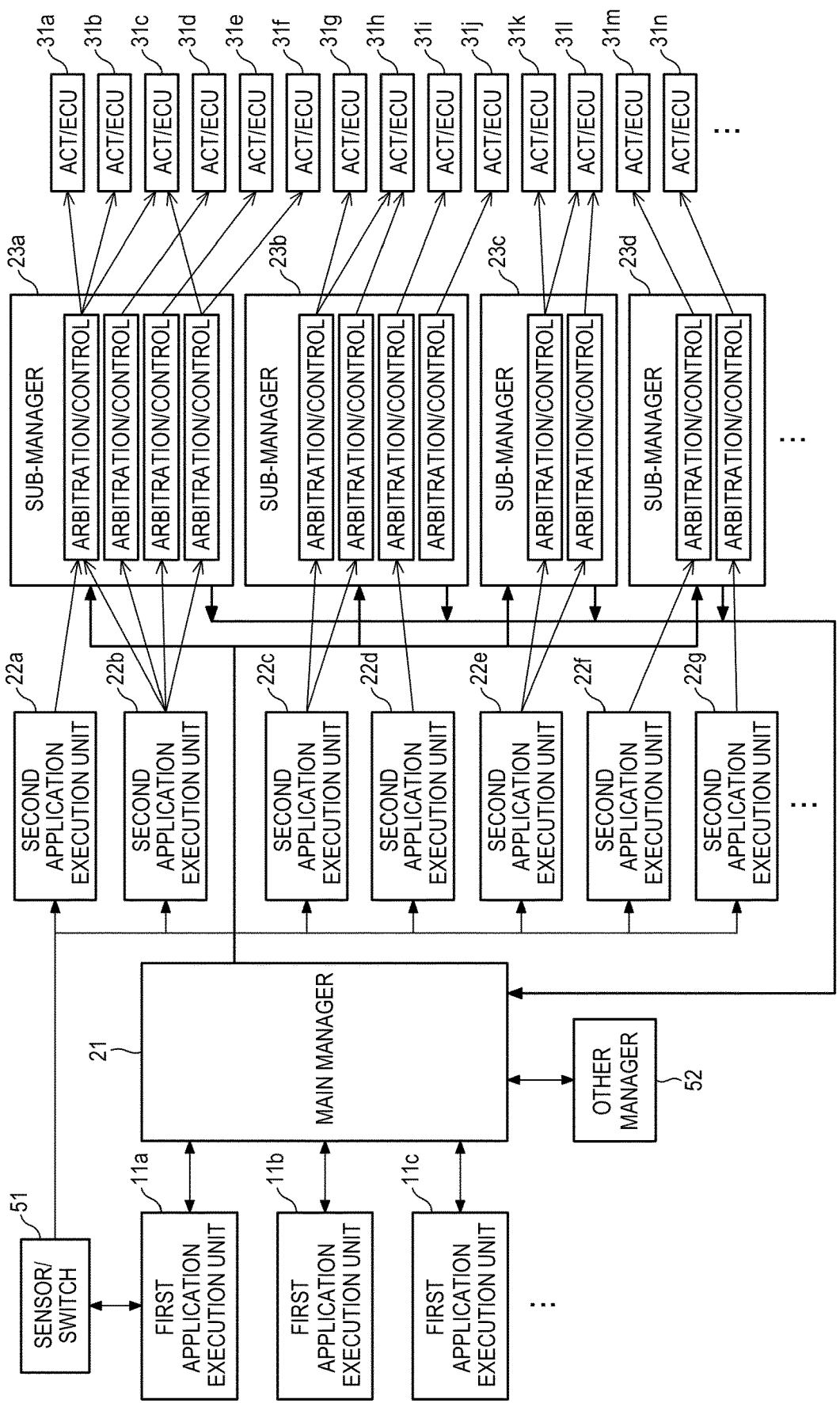
FIG. 1 is a functional block diagram showing a vehicular arbitration system according to one embodiment.

FIG. 1 is a functional block diagram showing a vehicular arbitration system 1 according to an embodiment of the disclosure. The vehicular arbitration system 1 illustrated in FIG. 1 includes a plurality of first application execution units 11a to 11c, a main manager 21, a plurality of second application execution units 22a to 22g, a plurality of sub-managers 23a to 23d, a plurality of ACTs/ECUs 31a to 31n, sensors/switches 51, and other managers 52.

The vehicular arbitration system 1 can be used in arbitrating, for example, requests for a plurality of body-based devices (also referred to as upper devices), such as a door lock, a light (lamp), an illumination, a mirror, a seat, a power window, and the like. In the present embodiment, the vehicular arbitration system 1 will be described by taking arbitration for body-related devices as an example.

The first application execution units 11a to 11c are devices for realizing functions (services) additionally mounted on a vehicle. As an example, the first application execution units 11a to 11c may include a device for implementing advanced vehicle driving assistance, such as automatic driving, automatic parking, adaptive cruise control, lane keep assist, collision mitigation brake, and the like, by executing an application for realizing a driving support function. Such a device constitutes a part of an advanced driving support system together with an application (not shown) for realizing a driving support function. In addition, as an example, the first application execution units 11a to 11c may include a device for implementing a voice operation, an action recognition operation, cooperation control, proposal, personal identification, pre-reading driving support, and the like by executing an application for realizing an agent function that improves convenience of an occupant. Such a device constitutes a part of a driver support system together with an application (not shown) for realizing an agent function. Information from the various sensors/switches 51 mounted on the vehicle is input to at least a part of the first application execution units 11a to 11c (in the example of FIG. 1, the first application execution unit 11a). Typically, the first application execution units 11a to 11c are realized by an electronic control unit (ECU) including a processor, such as a CPU or the like, and a memory. The first application execution units 11a to 11c output a request for using at least one of the ACTs/ECUs 31a to 31n to the main manager 21 in a form of an abstract request that cannot be interpreted by the sub-managers 23a to 23d as it is. The abstract request for using at least one of the ACTs/ECUs 31a to 31n will be described later.

The main manager 21 receives one or more requests from the first application execution units 11a to 11c, and may determine requests for operating the ACTs/ECUs 31a to 31n, based on the received requests and a predetermined rule. The main manager 21 receives abstract requests from the first application execution units 11a to 11c, and identifies and materializes a target ACT/ECU and a control content of the target ACT/ECU based on the received abstract requests. Furthermore, the main manager 21 receives predetermined information input from the plurality of sub-managers 23a to 23d, and centrally manages information on the sub-managers 23a to 23d. The information input from the sub-managers 23a to 23d to the main manager 21 includes equipping or non-equipping of the ACTs/ECUs, operation acceptability in the equipped ACTs/ECUs, and current operation state of the ACTs/ECUs. The main manager 21 determines the materialized request to be output to the sub-managers 23a to 23d, based on the information input from the sub-managers and a predetermined priority. Thus, the main manager 21 performs processing of requests between the plurality of functions (services) provided by the first application execution units 11a to 11c, in consideration of arbitration and/or the control content of the ACTs/ECUs 31a to 31n performed by the sub-managers 23a to 23d. A method for materializing the abstract request and the priority will be described later.

As the determination process, for example, the main manager 21 selects one request from the received requests, sets an execution order of the received requests, or rejects the requests, based on a predetermined rule. In addition, the main manager 21 transmits the determination result to the first application execution units 11a to 11c. Then, the main manager 21 instructs the request selected according to the determination process or the ordered request to the plurality of sub-managers 23a to 23d. Specifically, the main manager 21 instructs a specified control content to a sub-manager that control drive of the target ACT/ECU.

The second application execution units 22a to 22g are devices for realizing the existing functions originally provided to the vehicle. As an example, the second application execution units 22a to 22g may be devices for realizing predetermined operations of a door lock, an air conditioner, an illumination, a mirror, a seat, a power window, and the like by executing an application for realizing control of body-based devices. The second application execution units 22a to 22g are typically realized by an electronic control unit (ECU) including a processor, such as a CPU or the like, and a memory. The second application execution units 22a to 22g output a request for using at least one of the ACTs/ECUs 31a to 31n to at least one of the sub-managers 23a to 23d, based on information from the various sensors/switches 51 mounted on the vehicle. Examples of the sensors/switches 51 include a sensor, such as an on-vehicle camera or a millimeter wave radar or the like, and a switch, such as a hazard button or a turn command lever that receives an instruction input directly from a driver or the like. The request output from the second application execution units 22a to 22g to the sub-managers 23a to 23d includes information of the target ACT/ECU and the control content of the target ACT/ECU.

Each of the sub-managers 23a to 23d receives the request output from the main manager 21 and the request output from at least one of the second application execution units 22a to 22g, and may arbitrate a plurality of requests thus received. This arbitration is performed for each function (service) provided by the sub-managers. Requests may be input to the sub-managers from both of the main manager 21 and the second application execution units 22a to 22g. For example, it is conceivable that a lighting request of a headlight based on an illuminance sensor and a lighting-off request of a headlight based on "headlight off" collected by a voice recognition microphone are input in an overlapping manner. When such contradictory requests are simultaneously input, the sub-managers select one of the requests based on, for example, selection criteria prepared in advance. The selection criteria may be appropriately set based on a state of the vehicle, situation around the vehicle, a priority set for each of the applications, and the like.

Each of the sub-managers 23a to 23d controls operation of at least one of the ACTs/ECUs 31a to 31n based on the result obtained by arbitrating the requests. Examples of the control of the operation include control of an ON/OFF operation in the case of an ACT, and control of control parameters (intensity, speed, temperature, angle, and the like) in the case of an ECU. Furthermore, the sub-managers 23a to 23d feedback transmit information including a manageable ACT/ECU status to the main manager 21. This information includes, in addition to a current operation status of the ACTs/ECUs operated by the sub-managers, the equipment or non-equipment of the ACTs/ECUs that can be managed by the sub-managers, and the acceptance or non-acceptance of an operation in the equipped ACTs/ECUs. In addition, this information may include the result of the arbitration performed by the sub-managers.

The ACTs/ECUs 31a to 31n are on-vehicle devices such as actuators (ACTs) and electronic control units (ECUs) mounted on the vehicle. The ACTs/ECUs 31a to 31n are, for example, actuators for operating body-based devices, such as a door lock, an illumination, a mirror, and the like, electronic control units for controlling a seat, a wiper, a power window (P/W), a sunroof (S/R), and the like, relays, modules, and so forth.

Other managers 52 may be, for example, a human machine interface (HMI)-based manager that controls a suitable display on a navigation screen, a meter set or the like of a vehicle and notification using a speaker, a lamp or the like. The HMI-based manager can perform screen display and output using a sound, a lamp or the like based on an instruction from the main manager 21.

In the above embodiment, there has been described an example in which the abstract requests are transmitted from the first application execution units 11a to 11c to the main manager 21 and are materialized in the main manager 21. However, specific requests may be transmitted directly from the application execution units 11a to 11c to the main manager 21.

Concrete Configuration Examples

Figure 2:
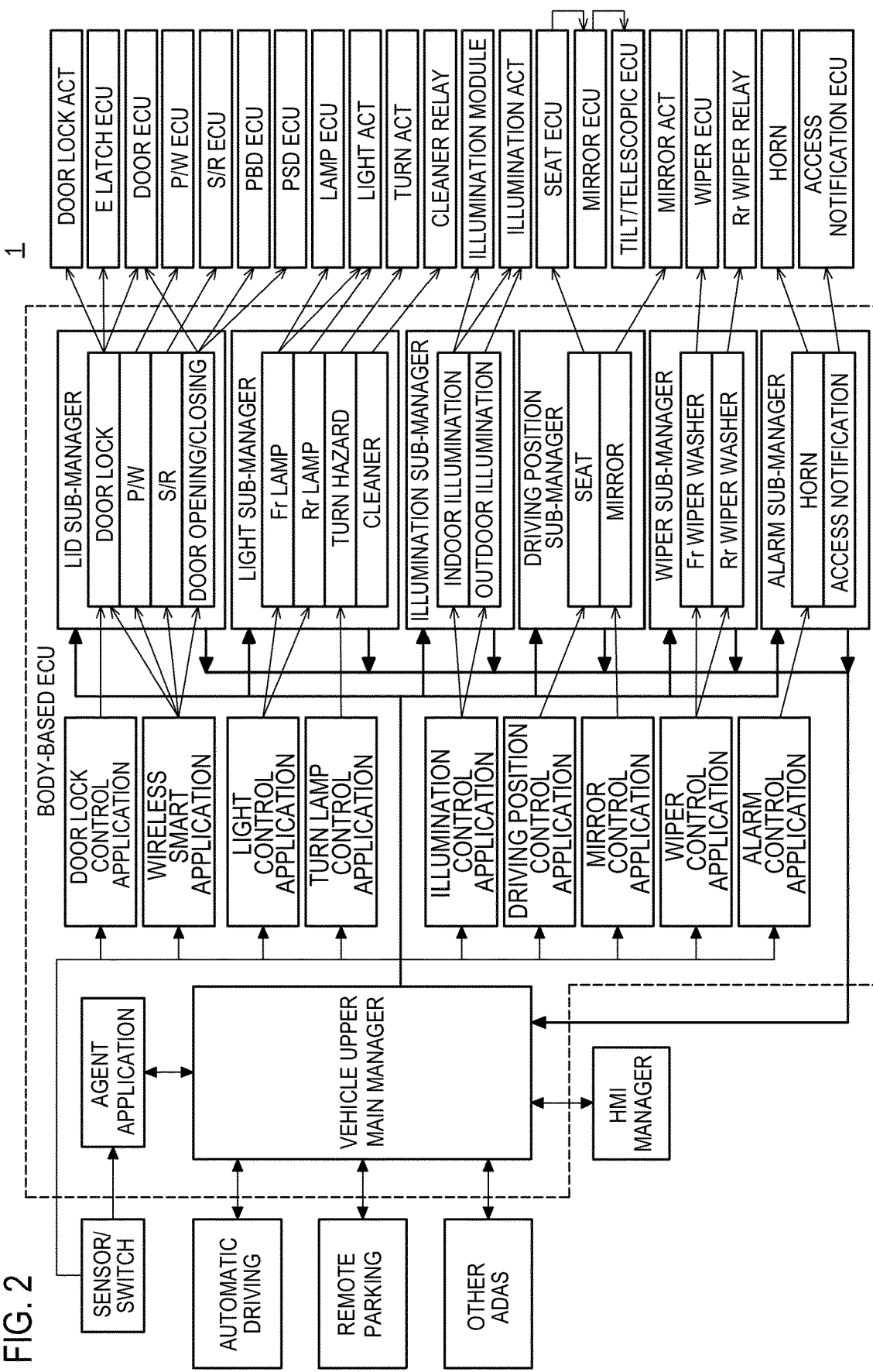
FIG. 2 is a functional block diagram specifically illustrating the vehicular arbitration system.

FIG. 2 illustrates a concrete example of the first application execution units 11a to 11c, the second application execution units 22a to 22g, the sub-managers 23a to 23d, and the ACTs/ECUs 31a to 31n of the above-described vehicular arbitration system 1.

In the vehicular arbitration system 1 shown in FIG. 2, conflicting requests respectively output from the respective applications of an automatic driving service, a remote parking service, other advanced driving support services (ADAS), and an agent service, which are the first application execution units 11a to 11c, are processed by the vehicle upper main manager. The result processed by the vehicle upper main manager is instructed to the sub-managers that control the ACTs/ECUs to be driven, among a lid sub-manager, a lighting sub-manager, an illumination sub-manager, a driving position sub-manager, a wiper sub-manager and an alarm sub-manager. In addition, the vehicle upper main manager sends the processed result back to the respective applications of the automatic driving service, the remote parking service, other ADAS, and the agent service, and outputs the processed result to the HMI manager.

The lid sub-manager is a sub-manager that controls a door lock ACT, an electronic latch (E latch) ECU, a door ECU, a power window (P/W) ECU, a sunroof (S/R) ECU, a power back door (PBD) ECU, and a power sliding door (PSD) ECU, which are involved in opening and closing of windows and doors. The lighting sub-manager is a sub-manager that controls a lamp ECU, a light ACT, a turn ACT, and a cleaner relay, which are involved in lighting and lighting-off of lights and blinkers. The illumination sub-manager is a sub-manager that controls an illumination module and an illumination ACT, which are involved in lighting and lighting-off of indoor/outdoor illuminations. The driving position sub-manager is a sub-manager that controls a seat ECU, a mirror ECU, a tilt and telescopic (tilt/telescopic) ECU, and a mirror ACT, which are involved in adjustment of a driving posture of a driver. The wiper sub-manager is a sub-manager that controls a wiper ECU and a Rr wiper relay, which are involved in operation of a wiper and a washer. The alarm sub-manager is a sub-manager that controls a horn and an access notification ECU, which are involved in honking and alerting operation.

The lid sub-manager serves as the second application execution unit to arbitrate the requests respectively output from the application for door lock control and the application for wireless smart control, and the request instructed from the vehicle upper main manager. The arbitration is performed with respect to a door lock function, a P/W function, an S/R function, and a door opening/closing function, based on an arbitration function. Then, the lid sub-manager controls corresponding ACTs/ECUs among the door lock ACT, the E latch ECU, the door ECU, the P/W ECU, the S/R ECU, the PBD ECU, and the PSD ECU, based on the arbitration result. In addition, the lid sub-manager transmits information on the ACT/ECU control based on the arbitration result, information on the equipping of the door lock ACT, the E latch ECU, the door ECU, the P/W ECU, the S/R ECU, the PBD ECU, and the PSD ECU, and information on which of these ACTs/ECUs can accept the operation, to the vehicle upper main manager.

The light sub-manager serves as the second application execution unit to arbitrate the requests respectively output from the application for light control and the application for turn lamp control and the request instructed from the vehicle upper main manager. This arbitration is performed with respect to a front (Fr) lamp function, a rear (Rr) lamp function, a turn hazard function, and a cleaner function, based on the arbitration function. Then, the light sub-manager controls corresponding ACTs/ECUs among the lamp ECU, the light ACT, the turn ACT, and the cleaner relay, based on the arbitration result. In addition, the light sub-manager transmits information on the ACT/ECU control based on the arbitration result, information on the equipping of the lamp ECU, the light ACT, the turn ACT, and the cleaner relay, and information on which of these ACTs/ECUs can accept the operation, to the vehicle upper main manager.

The illumination sub-manager serves as the second application execution unit to arbitrate the request output from the application for illumination control and the request instructed from the vehicle upper main manager. The arbitration is performed with respect to an indoor illumination function and an outdoor illumination function, based on the arbitration function. Then, the illumination sub-manager controls corresponding ACT/ECU among the illumination module and the illumination ACT, based on the arbitration result. In addition, the illumination sub-manager transmits information on the ACT and ECU control based on the arbitration result, information on the equipping of the illumination module and the illumination ACT, and information on which of these ACT/ECU can accept the operation, to the vehicle upper main manager.

The driving position sub-manager serves as the second application execution unit to arbitrate the requests respectively output from the application for driving position control and the application for mirror control and the request instructed from the vehicle upper main manager. This arbitration is performed with respect to a seat function and a mirror function, based on the arbitration function. Then, the driving position sub-manager controls corresponding ACTs/ECUs among the seat ECU, the mirror ECU, the tilt/telescopic ECU, and the mirror ACT, based on the arbitration function. In addition, the driving position sub-manager transmits information on the ACT/ECU control based on the arbitration result, information on the equipping of the seat ECU, the mirror ECU, the tilt/telescopic ECU, and the mirror ACT, and information on which of these ACTs/ECUs can accept the operation, to the vehicle upper main manager.

The wiper sub-manager serves as the second application execution unit to arbitrate the request output from the application for wiper control and the request instructed from the vehicle upper main manager. This arbitration is performed with respect to a front (Fr) wiper-washer function and a rear (Rr) wiper-washer function, based on the arbitration function. Then, the wiper sub-manager controls corresponding ACT/ECU out of the wiper ECU and the Rr wiper relay, based on the arbitration result. In addition, the wiper sub-manager transmits information on the ACT/ECU control based on the arbitration result, information on the equipping of the wiper ECU and the Rr wiper relay, and information on which of these ACTs/ECUs can accept the operation, to the vehicle upper main manager.

The alarm sub-manager serves as the second application execution unit to arbitrate the request output from the application for alarm control and the request instructed from the vehicle upper main manager. This arbitration is performed with respect to a horn function and an access notification function, based on the arbitration function. Then, the alarm sub-manager controls corresponding ACT/ECU out of the horn and the access notification ECU, based on the arbitration result. In addition, the alarm sub-manager transmits information on the ACT/ECU control based on the arbitration result, information on the equipping of the horn and the access notification ECU, and information on which of these ACTs/ECUs can accept the operation, to the vehicle upper main manager.

In the vehicular arbitration system 1 shown in FIG. 2, the main manager and the sub-managers are provided in a body ECU. By providing the main manager and the sub-managers in the same ECU, it is possible to reduce the mounting cost. In addition, the result of arbitration obtained by the sub-managers can be quickly fed back to the main manager via a signal line in the body ECU without passing through an in-vehicle network. This makes it possible to reduce the communication processing load borne by the main manager.

Functions of Main Manager

Figure 3A:
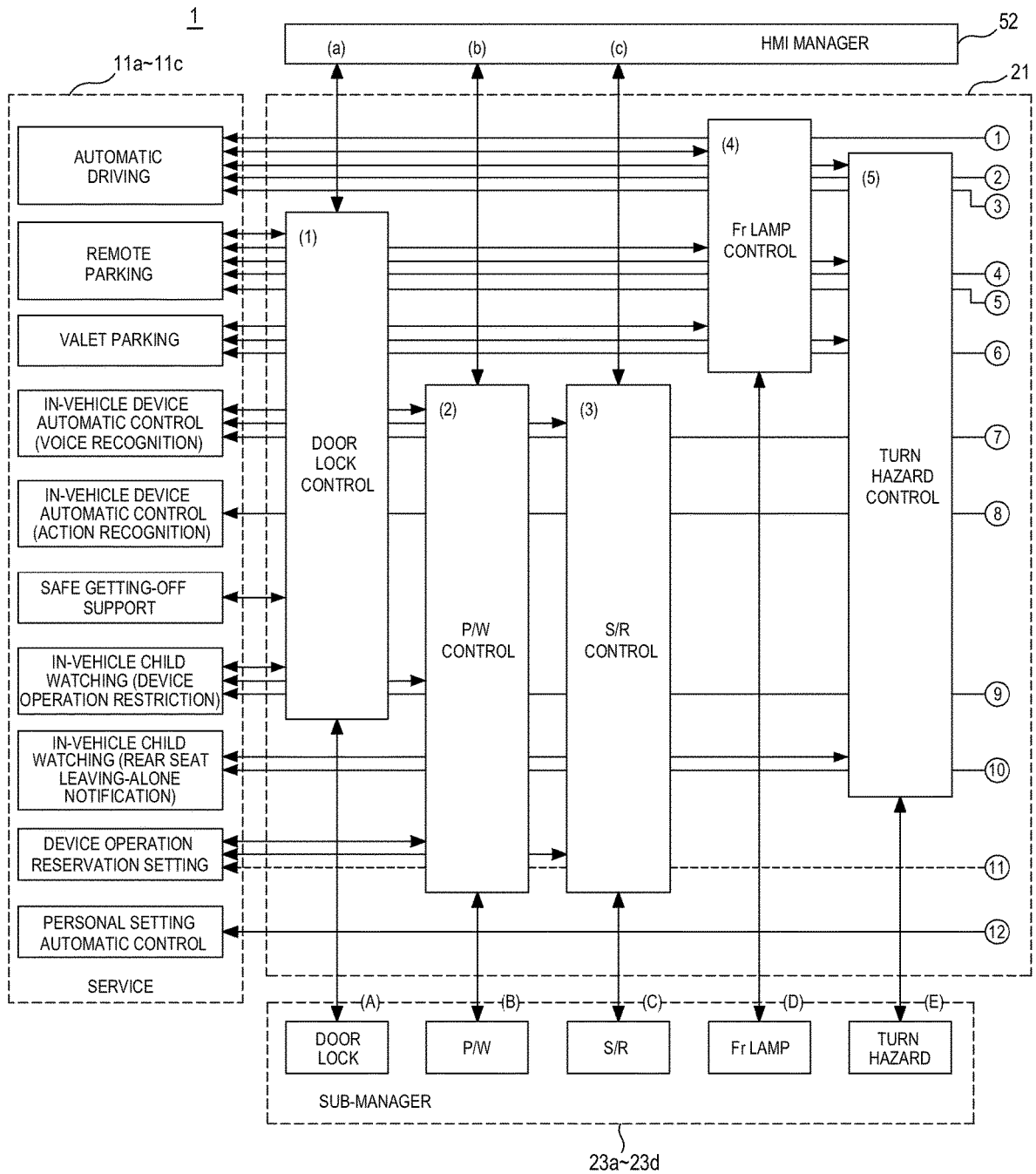
FIG. 3A is a diagram showing a relationship between a main manager, each sub-manager, and each application execution unit.
Figure 3B:
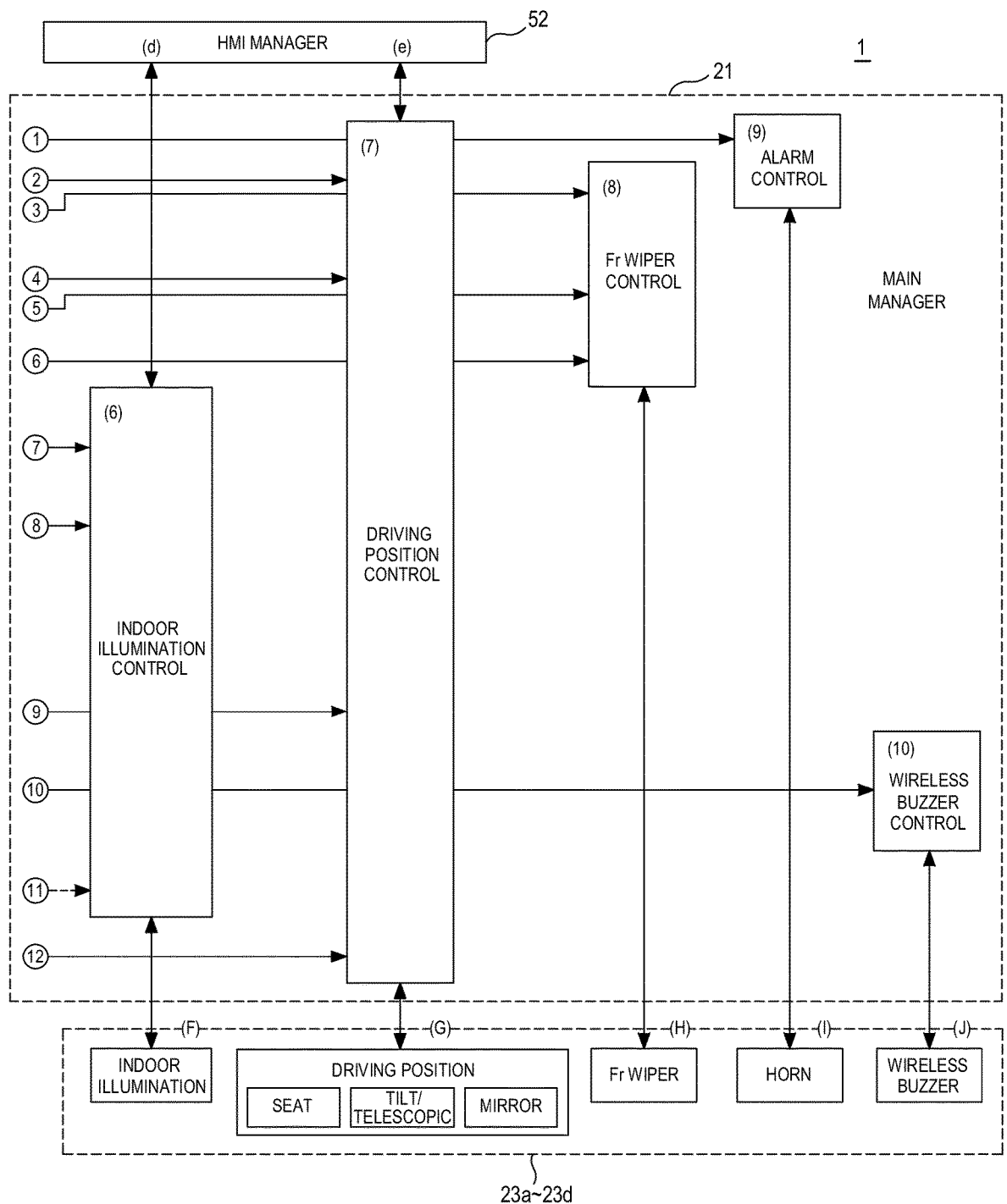
FIG. 3B is a diagram showing a relationship between a main manager, each sub-manager, and each application execution unit.

Details of the functions of the main manager 21 will be described with further reference to FIGS. 3A to 28. FIGS. 3A and 3B are diagrams showing an example of a relationship between various requests output from the first application execution units 11a to 11c, various control operations implemented in the main manager 21, sub-managers 23a to 23d, and other managers 52. FIGS. 4 to 28 are diagrams showing examples of requests, instructions, notifications, and the like exchanged between the main manager and the respective application execution units and the sub-managers in various control operations implemented in the main manager 21.

FIGS. 3A and 3B illustrate, as the first application execution units 11a to 11c, various services such as automatic driving, remote parking, valet parking, in-vehicle device automatic control (voice recognition), in-vehicle device automatic control (action recognition), safe getting-off support, in-vehicle child watching (device operation restriction), in-vehicle child watching (rear seat leaving-alone notification), device operation reservation setting, and personal setting automatic control. Moreover, as the control operations performed by the main manager 21, there are illustrated door lock control, P/W control, S/R control, Fr lamp control, turn hazard control, indoor illumination control, driving position control, Fr wiper control, alarm control, and wireless buzzer control. Furthermore, as the functions to be arbitrated by the sub-managers 23a to 23d, there are illustrated a door lock, a P/W, a S/R, a Fr lamp, a turn hazard, an indoor illumination, a driving position (sheet, tilt/telescopic, mirror), a Fr wiper, a horn, and a wireless buzzer. In addition, as other managers 52, there is illustrated an HMI manager.

(1) Door Lock Control

The main manager 21 performs door lock control based on requests received from services, such as safe getting-off support, in-vehicle child watching (device operation restriction), remote parking, and the like. FIG. 4 shows an example of the application requests received by the main manager 21 from the respective services in respect of the door lock control and the information fed back from the main manager 21 to the respective services in respect of the door lock control.

The main manager 21 receives, from the safe getting-off support service, an application request (including a type of service and a value indicating start or stop) for requesting start or stop of a service, or an application request (including a value indicating the presence or absence of a non-permission request) for requesting non-permission of unlatch for each of a driver seat (D seat), a front passenger seat (P seat), a rear right seat (RR seat), and a rear left seat (RL seat). In response, the main manager 21 feeds the lock/unlock state (including a value indicating lock or unlock) of each of the D seat, the P seat, the RR seat, and the RL seat back to the safe getting-off support service. Information to be fed back is obtained from the sub-managers 23a to 23d.

The main manager 21 receives, from the in-vehicle child watching (device operation restriction) service, an application request (including a type of service and a value indicating start or stop) for requesting start or stop of a service, or an application request (including a value indicating the presence or absence of a non-permission request) for requesting non-permission of unlatch for each of the D seat, the P seat, the RR seat, and the RL seat. In response, the main manager 21 feeds the lock/unlock state (including a value indicating lock or unlock) of each of the D seat, the P seat, the RR seat, and the RL seat back to the in-vehicle child watching (device operation restriction) service. Information to be fed back is obtained from the sub-managers 23a to 23d.

The main manager 21 receives, from the remote parking service, an application request (including a value indicating the presence or absence of a lock request) for requesting lock of a door, or an application request (including a value indicating the presence or absence of an unlock request) for requesting unlock of the door. In response, the main manager 21 feeds the state (including a value indicating an open state or a closed state) of a courtesy switch of each of the D seat, the P seat, the RR seat, and the RL seat back to the remote parking service. Information to be fed back is obtained from the sub-managers 23a to 23d. The state of the courtesy switch is used in a remote parking start condition and a remote parking stop condition.

As shown in FIG. 4, the main manager 21 may sometimes receive different requests for the same ACT/ECU from different services involved in the door lock control. For example, the main manager 21 may receive a P seat unlatch non-permission absence request from the safe getting-off support service and a P seat unlatch non-permission presence request from the in-vehicle child watching (device operation restriction) service, which are directed to the P seat E door lock ACT. In such a case, the main manager 21 processes the plurality of requests according to a predetermined rule described later, determines adoption of any one of the P seat unlatch non-permission absence request and the P seat unlatch non-permission presence request, an execution order of the requests, or the like, and outputs the determined request to the sub-managers 23a to 23d.

FIG. 5 shows an example of requests output from the main manager 21 to the sub-managers 23a to 23d (lid sub-managers) and the operation states of the ACTs/ECUs fed back from the sub-managers 23a to 23d to the main manager 21, in respect of the door lock control shown as (A) of FIG. 3A.

As a result of control, for each of the D seat, the P seat, the RR seat, and the RL seat, the main manager 21 outputs an unlatch non-permission request (including a value indicating the presence or absence of a non-permission request), a door lock request according to remote parking (including a value indicating the presence or absence of a lock request), or a door unlock request according to remote parking (including a value indicating the presence or absence of an unlock request), to the lid sub-managers. On the other hand, the main manager 21 receives a state (including a value indicating an open state or a closed state) of the courtesy switch of each of the D seat, the P seat, the RR seat, and the RL seat, or a lock/unlock state of each of the D seat, the P seat, the RR seat, and the RL seat (including a value indicating lock or unlock), which is input from the lid sub-manager.

FIG. 6 shows an example of requests to the HMI manager, which are shown as (a) of FIG. 3A and which are received by the main manager 21 from the safe getting-off support service in respect of the door lock control. The main manager 21 receives, from the safe getting-off support service, an application request (including an instruction of display contents) for requesting indication of multi-information display (MID), an application request (including an instruction of buzzer sounding) for requesting sounding of an in-vehicle buzzer, an application request (including an instruction of display contents) for requesting screen display, or an application request (including an instruction of utterance contents) for requesting voice utterance, and outputs the application request to the HMI manager.

As described above, the main manager 21 can appropriately control the requests related to the door lock, which are individually received from the services, such as safe getting-off support, in-vehicle child watching (device operation restriction), remote parking, and the like, based on the feedback information received from the sub-managers 23*a* to 23*d* (lid sub-managers).

(2) P/W Control

The main manager 21 performs P/W control based on requests received from services, such as in-vehicle device automatic control (voice recognition), device operation reservation setting, in-vehicle child watching (device operation restriction), and the like. FIG. 7 shows an example of the application requests received by the main manager 21 from the respective services in respect of the P/W control and the information fed back from the main manager 21 to the respective services in respect of the P/W control.

The main manager 21 receives, from the in-vehicle device automatic control (voice recognition) service, an application request (including a value indicating a type of service and start or stop) for requesting start or stop of a service, or an application request (including a value indicating a location, an open state, a closed state, or a stopped state) for requesting a P/W operation by a voice operation. In response, the main manager 21 feeds the operability or non-operability of a P/W (including a value indicating permission or non-permission), or the operation state of the P/W (including a value indicating start, rejection, stop, or termination) back to the in-vehicle device automatic control (voice recognition) service. Information to be fed back is obtained from the sub-managers 23*a* to 23*d*.

The main manager 21 receives, from the device operation reservation setting service, an application request (including a value indicating a type of service and start or stop) for requesting start or stop of a service, or an application request (including a value indicating a location, an open state, a closed state, or a stopped state) for requesting control of the P/W by operation reservation. In response, the main manager 21 feeds the operability or non-operability of the P/W (including a value indicating permission or non-permission), or the operation state of the P/W (including a value indicating start, rejection, stop, or termination) back to the device operation reservation setting service. Information to be fed back is obtained from the sub-managers 23*a* to 23*d*.

In addition, the main manager 21 receives, from the in-vehicle child watching (device operation restriction) service, an application request (including a value indicating the presence or absence of a non-operation request) for requesting a non-operation of the P/W as a device operation restriction at the time of getting-on of a child.

As shown in FIG. 7, the main manager 21 may sometimes receive different requests for the same ACT/ECU from different services involved in the P/W control. For example, the main manager 21 may receive a P/W opening request from the in-vehicle device automatic control (voice recognition) service and a P/W closing request from the device operation reservation setting service, which are directed to the P/W ECU. In such a case, the main manager 21 processes the plurality of requests according to a predetermined rule described later, determines adoption of any one of the P/W opening request and the P/W closing request, an execution order of the requests, or the like, and outputs the determined request to the sub-managers 23*a* to 23*d*.

FIG. 8 shows an example of requests output from the main manager 21 to the sub-managers 23*a* to 23*d* (lid sub-managers) and the operation states of the ACTs/ECUs fed back from the sub-managers 23*a* to 23*d* to the main manager 21, in respect of the P/W control shown as (B) of FIG. 3A.

As a result of control, the main manager 21 outputs a P/W operation request (including a value indicating a location, an open state, a closed state, or a stopped state), or a P/W permission signal request (including a value indicating ON or OFF), to the lid sub-managers. On the other hand, the main manager 21 receives a P/W operation state (including a value indicating operation, reversal, or stop), or P/W position information (including a value indicating a fully opened position, a halfway position, or a fully closed position), which is input from the lid sub-manager.

FIG. 9 shows an example of requests to the HMI manager, which are shown as (b) of FIG. 3A and which are received by the main manager 21 from the in-vehicle child watching (device operation restriction) service or the like in respect of the P/W control. The main manager 21 receives, from the in-vehicle child watching (device operation restriction) service, an application request (including an instruction of notification contents) for requesting voice notification, or an application request (including an instruction of display contents) for requesting screen display, and outputs the application request to the HMI manager. In addition, when the main manager 21 acquires information indicating that a P/W emergency stop switch has been pressed, the main manager 21 outputs switch information indicating that the emergency stop switch is turned on, to the HMI manager. When the main manager 21 receives a request on display of an operation state of a P/W (for example, the display in operation and the display of the emergency switch), the main manager 21 outputs a request including an instruction to turn the display on or off, to the HMI manager.

As described above, the main manager 21 can appropriately control the requests related to the P/W, which are individually received from the services, such as in-vehicle device automatic control (voice recognition), device operation reservation setting, in-vehicle child watching (device operation restriction), and the like, based on the feedback information received from the sub-managers 23*a* to 23*d* (lid sub-managers).

(3) S/R Control

The main manager 21 performs S/R control based on requests received from services, such as in-vehicle device automatic control (voice recognition), device operation reservation setting, and the like. FIG. 10 shows an example of the application requests received by the main manager 21 from the respective services in respect of the S/R control and the information fed back from the main manager 21 to the respective services in respect of the S/R control.

The main manager 21 receives, from the in-vehicle device automatic control (voice recognition) service, an application request (including a value indicating a type of service and start or stop) for requesting start or stop of a service, or an application request (including a value indicating an open state, a closed state, or a stopped state) for requesting an S/R operation by a voice operation. In response, the main manager 21 feeds the operability or non-operability of the S/R (including a value indicating permission or non-permission), or the operation state of an S/R (including a value indicating start, rejection, stop, or termination, and a position) back to the in-vehicle device automatic control (voice recognition) service. Information to be fed back is obtained from the sub-managers 23*a* to 23*d*.

The main manager 21 receives, from the device operation reservation setting service, an application request (including a value indicating a type of service and start or stop) for requesting start or stop of a service, or an application request (including a value indicating an open state, a closed state, or a stopped state) for requesting control of the S/R by operation reservation. In response, the main manager 21 feeds the operability or non-operability of the S/R (including a value indicating permission or non-permission), or the operation state of the S/R (including a value indicating start, rejection, stop or termination and a position) back to the device operation reservation setting service. Information to be fed back is obtained from the sub-managers 23a to 23d.

As shown in FIG. 10, the main manager 21 may sometimes receive different requests for the same ACT/ECU from different services involved in the S/R control. For example, the main manager 21 may receive an S/R stop request from the in-vehicle device automatic control (voice recognition) service and an S/R opening request from the device operation reservation setting service, which are directed to the S/R ECU. In such a case, the main manager 21 processes the plurality of requests according to a predetermined rule described later, determines adoption of any one of the S/R stop request and the S/R opening request, an execution order of the requests, or the like, and outputs the determined request to the sub-managers 23a to 23d.

FIG. 11 shows an example of requests output from the main manager 21 to the sub-managers 23a to 23d (lid sub-managers) and the operation states of the ACTs/ECUs fed back from the sub-managers 23a to 23d to the main manager 21, in respect of the S/R control shown as (C) of FIG. 3A.

As a result of control, the main manager 21 outputs an S/R operation request (including a value indicating an open state, a closed state, or a stopped state), to the lid sub-managers. On the other hand, the main manager 21 receives an S/R operation state (including a value indicating operation, reversal, or stop), or S/R position information (including a value indicating a fully opened position, a halfway position, or a fully closed position), which is input from the lid sub-manager.

FIG. 12 shows an example of contents requested to the HMI manager by the main manager 21 in respect of the S/R control, which are shown as (c) of FIG. 3A. When the main manager 21 acquires information indicating that an S/R emergency stop switch has been pressed, the main manager 21 outputs switch information indicating that the emergency stop switch is turned on, to the HMI manager. When the main manager 21 receives a request on display of an operation state of the S/R (for example, the display in operation and the display of the emergency switch), the main manager 21 outputs a request including an instruction to turn the display on or off, to the HMI manager.

As described above, the main manager 21 can appropriately control the requests related to the S/R, which are individually received from the services, such as in-vehicle device automatic control (voice recognition), device operation reservation setting, and the like, based on the feedback information received from the sub-managers 23a to 23d (lid sub-managers).

(4) Fr Lamp Control

The main manager 21 performs Fr lamp control based on requests, instructions, notifications, and the like received from the respective services, such as remote parking, automatic driving, and the like. FIG. 13 shows an example of the requests, the instructions, and the notifications received by the main manager 21 from the respective services in respect of the Fr lamp control and the information fed back from the main manager 21 to the respective services in respect of the Fr lamp control.

The main manager 21 receives, from the remote parking service, an instruction of start of forward/backward movement control, a notification of start of forward/backward movement control, or a notification of completion of vehicle withdrawal by forward/backward movement control, at the time of vehicle withdrawal. Furthermore, the main manager 21 receives, from the remote parking service, an instruction of start of forward/backward movement control, a notification of confirmation of a forward/backward movement control start condition, a notification of start of forward/backward movement control, or a notification of completion of vehicle storage by forward/backward movement control, at the time of vehicle storage. Each instruction or notification includes a value of ON or OFF. Furthermore, the main manager 21 receives a remote parking state from the remote parking service. In response, the main manager 21 feeds a notification of completion of start of forward/backward movement control, a notification of completion of getting-off of a driver in forward/backward movement control, a notification of response of a forward/backward movement control start condition, a notification of response of start of forward/backward movement control, or a notification of response of completion of vehicle storage by forward/backward movement control, at the time of vehicle storage, back to the remote parking service. Each notification includes a value of ON or OFF. Information to be fed back is obtained from the sub-managers 23a to 23d.

In addition, the main manager 21 receives, from the automatic driving service, an application request (including a value indicating start, wait, or end) for requesting setting of automatic light by automatic driving. Furthermore, the main manager 21 transmits a notification that a reservation switch for remote parking has been turned off, to a predetermined vehicle system.

FIG. 14 shows an example of the requests and notifications output from the main manager 21 to the sub-managers 23a to 23d (light sub-managers) in respect of the Fr lamp control shown as (D) of FIG. 3A.

As a result of control, the main manager 21 outputs a request related to lighting or lighting-off of headlights (including a value indicating lighting or lighting-off), or a request for automatic lighting to the existing light application (including a value of ON or OFF), to the light sub-manager. In addition, the light sub-managers are notified of the state (including a value of ON or OFF) indicating whether or not the vehicle is in an automatic driving mode.

As described above, the main manager 21 can appropriately control the requests related to the Fr lamps, which are individually received from the services, such as remote parking, automatic driving, and the like, based on the feedback information received from the sub-managers 23a to 23d (light sub-managers).

(5) Turn Hazard Control

The main manager 21 performs turn hazard control based on requests, instructions, notifications, and the like received from the respective services, such as remote parking, automatic driving, in-vehicle child watching (rear seat leaving-alone notification), and the like. FIG. 15 shows an example of the requests, the instructions, and the notifications received by the main manager 21 from the respective services in respect of the turn hazard control and the information fed back from the main manager 21 to the respective services in respect of the turn hazard control.

The main manager 21 receives, from the remote parking service, an instruction of start of forward/backward movement control, a notification of start of forward/backward movement control, or a notification of completion of vehicle withdrawal by forward/backward movement control, at the time of vehicle withdrawal. Furthermore, the main manager 21 receives, from the remote parking service, an instruction of start of forward/backward movement control, a notification of confirmation of a forward/backward movement control start condition, a notification of start of forward/backward movement control, or a notification of completion of vehicle storage by forward/backward movement control, at the time of vehicle storage. Each instruction or notification includes a value of ON or OFF. Furthermore, the main manager 21 receives a remote parking state from the remote parking service. In response, the main manager 21 feeds a notification of completion of start of forward/backward movement control, a notification of completion of getting-off of a driver in forward/backward movement control, a notification of response of a forward/backward movement control start condition, a notification of response of start of forward/backward movement control, or a notification of response of completion of vehicle storage by forward/backward movement control, at the time of vehicle storage, back to the remote parking service. Each notification includes a value of ON or OFF. Information to be fed back is obtained from the sub-managers 23*a* to 23*d*.

Furthermore, the main manager 21 receives, from the automatic driving service, an application request for requesting blinking of right and left turn lamps at the time of lane change through automatic driving, or an application request for requesting the blinking of right and left turn lamps at the time of right or left turning through automatic driving. Each request includes a value of ON or OFF. In addition, the main manager 21 receives, from the in-vehicle child watching (rear seat leaving-alone notification) service, an application request (including a value of ON or OFF) for requesting blinking of a hazard to prevent a child or the like from being left alone at the rear seat of the vehicle. Furthermore, the main manager 21 transmits a notification that a reservation switch for remote parking has been turned off, to a predetermined vehicle system.

FIG. 16 shows an example of the requests and notifications output from the main manager 21 to the sub-managers 23*a* to 23*d* (light sub-managers) in respect of the turn hazard control shown as (E) of FIG. 3A.

As a result of control, the main manager 21 outputs a request related to the blinking of a flasher (including a value instructing absence or hazard blinking), a request for the blinking of right or left turn lamp along with lane change (including a value instructing absence or blinking a right lamp X times or blinking a left lamp X times), or a request for the blinking of right or left turn lamp along with right or left turn (including a value instructing absence or right turn blinking or left turn blinking), to the light sub-managers.

As described above, the main manager 21 can appropriately control the requests related to a turn hazard, which are individually received from the services, such as remote parking, automatic driving, in-vehicle child watching (rear seat leaving-alone notification), and the like, based on the feedback information received from the sub-managers 23*a* to 23*d* (light sub-managers).

(6) Indoor Illumination Control

The main manager 21 performs indoor illumination control based on requests received from services, such as in-vehicle device automatic control (voice recognition) and in-vehicle device automatic control (action recognition). FIG. 17 shows an example of application requests received by the main manager 21 from each service in respect of the indoor illumination control.

The main manager 21 receives, from the in-vehicle device automatic control (voice recognition) service, an application request (including a value indicating a type of service and start or stop) for requesting start or stop of a service, or an application request (including a value indicating an area, a lighting state, a switching state, or a lighting-off state) for requesting lighting or lighting-off of an illumination. In addition, the main manager 21 receives, from the in-vehicle device automatic control (action recognition) service, an application request (including a value indicating a type of service and start or stop) for requesting the start or stop of a service, or an application request (including a value indicating an area, a lighting state, a switching state, or a lighting-off state) for requesting the lighting or lighting-off of an illumination.

As shown in FIG. 17, the main manager 21 may sometimes receive different requests for the same ACT/ECU from different services involved in the indoor illumination control. For example, the main manager 21 may receive an illumination lighting request from the in-vehicle device automatic control (voice recognition) service and an illumination lighting-off request from the in-vehicle device automatic control (action recognition) service, which are directed to the illumination module and the illumination ACT. In such a case, the main manager 21 processes the plurality of requests according to a predetermined rule described later, determines adoption of any one of the illumination lighting request and the illumination lighting-off request, an execution order of the requests, or the like, and outputs the determined request to the sub-managers 23*a* to 23*d*.

FIG. 18 shows an example of the requests output from the main manager 21 to the sub-managers 23*a* to 23*d* (illumination sub-managers) and the operation states of the ACTs/ECUs fed back from the sub-managers 23*a* to 23*d* to the main manager 21, in respect of the indoor illumination control shown as (F) of FIG. 3B.

As a result of control, the main manager 21 outputs a request for the lighting or lighting-off of an indoor illumination (including a values indicating the presence or absence, a target, an achieved brightness, a control pattern, and a time) to the illumination sub-manager. On the other hand, the main manager 21 receives the state of the lighting or lighting-off of an indoor illumination (including a value indicating OK or NG) input from the illumination sub-manager.

FIG. 19 shows an example of the content requested to the HMI manager by the main manager 21 in respect of the indoor illumination control shown as (d) of FIG. 3B. The main manager 21 outputs a request to display (ON) or not to display (OFF) the lighting state of an illumination on a screen to the HMI manager, or outputs a request to stop the screen display to the HMI manager.

As described above, the main manager 21 can appropriately control the requests related to indoor illumination, which are individually received from the services, such as in-vehicle device automatic control (voice recognition) and in-vehicle device automatic control (action recognition), based on the feedback information received from the sub-managers 23*a* to 23*d* (illumination sub-managers).

(7) Driving Position Control

The main manager 21 performs driving position control based on requests received from services, such as personal setting automatic control, remote parking, automatic parking, in-vehicle child watching (device operation restriction), and the like. FIG. 20 shows an example of application requests received by the main manager 21 from each service in respect of the driving position control and information fed back from the main manager 21 to each service in respect of the driving position control.

The main manager 21 receives, from the personal setting automatic control service, an application request (including setting values of a seat, a tilt/telescopic, and a mirror) for requesting a setting value of a driving position set in advance to each individual, an application request (including a value indicating the presence or absence of a start request) for requesting start of automatic adjustment of a driving position before getting on a vehicle, an application request (including a value indicating the presence or absence of a start request) for requesting start of automatic adjustment of a driving position after getting on a vehicle, or an application request (including a value indicating the presence or absence of a start request) for requesting start of automatic adjustment of a driving position at the time of switching between automatic driving and manual driving. In response, the main manager 21 feeds an end of the automatic adjustment (reproduction) of an individually set driving position and the positional information (sheet, tilt/telescopic, and mirror) of the driving position, back to the personal setting automatic control service. Information to be fed back is obtained from the sub-managers 23a to 23d.

Furthermore, the main manager 21 receives, from the remote parking service, an application request for requesting setting of a control mode (start or end of remote parking) at the time of remote parking, or an application request for requesting setting of a seat control mode (a relaxation mode, a seat full flat mode, and the like). Moreover, the main manager 21 receives, from the automatic driving service, an application request for requesting setting of a control mode (start or end of remote parking) at the time of automatic driving, or an application request for requesting setting of a seat control mode (a relaxation mode, a seat full flat mode, and the like). In addition, the main manager 21 receives, from the in-vehicle child watching (device operation restriction) service, an application request (including a value indicating a type of a seat and the presence or absence of a request) for requesting inhibition of an operation of a seat.

As shown in FIG. 20, the main manager 21 may sometimes receive different requests for the same ACT/ECU from different services involved in the driving position control. For example, the main manager 21 may receive a seat control mode (relaxation mode) setting request from the remote parking service and a seat control mode (seat full flat mode) setting request from the automatic driving service, which are directed to the seat ECU. In such a case, the main manager 21 processes the plurality of requests according to a predetermined rule described later, determines adoption of any one of the seat control mode (relaxation mode) setting request and the seat control mode (seat full flat mode) setting request, an execution order of the requests, or the like, and outputs the determined request to the sub-managers 23a to 23d.

FIG. 21 shows an example of the requests output from the main manager 21 to the sub-managers 23a to 23d (driving position sub-managers) and the operation states of the ACTs/ECUs fed back from the sub-managers 23a to 23d to the main manager 21, in respect of the driving position control shown as (G) of FIG. 3B.

As a result of control, the main manager 21 outputs a request for setting values of the driving position (seat, tilt/telescopic, and mirror), a request (including a value indicating the presence or absence of a start request) for start of automatic adjustment of the driving position, a request (including a value indicating the presence or absence of a stop request) for stop of automatic adjustment of the driving position, a request (including a value indicating the presence or absence of a storage request) for storage of the driving position, a request for the setting of a seat control mode (an indication value of ON or OFF) at the time of automatic driving, a request for the folding or unfolding of side mirrors, a request for the setting of a seat control mode (a relaxation mode, a seat full flat mode, support, and the like), a request for the inhibition of a seat operation, or a pneumatic refresh request, to the driving position sub-manager. On the other hand, the main manager 21 receives a notification of end of reproduction of the driving position, which is input from the driving position sub-manager.

FIG. 22 shows an example of requests to the HMI manager, which are shown as (e) of FIG. 3B and which are received by the main manager 21 from the in-vehicle child watching (device operation restriction), and the like in respect of the driving position control. The main manager 21 receives, from the in-vehicle child watching (device operation restriction) service, an application request (including an instruction of a notification content) for requesting a voice notification, or an application request (including an instruction of a display content) for requesting a screen display, and outputs the application request to the HMI manager. In addition, when the main manager 21 acquires information indicating that an emergency stop switch of a driving position has been pressed, the main manager 21 outputs, to the HMI manager, switch information indicating that the emergency stop switch is turned on.

As described above, the main manager 21 can appropriately control the requests related to the driving position, which are individually received from the services, such as personal setting automatic control, remote parking, automatic parking, in-vehicle child watching (device operation restriction), and the like, based on the feedback information received from the sub-managers 23a to 23d (driving position sub-managers).

(8) Fr Wiper Control

The main manager 21 performs Fr wiper control based on requests, instructions, notifications, and the like received from the respective services, such as remote parking, automatic driving, and the like. FIG. 23 shows an example of the requests, the instructions, and the notifications received by the main manager 21 from the respective services in respect of the Fr wiper control and the information fed back from the main manager 21 to the respective services in respect of the Fr wiper control.

The main manager 21 receives, from the remote parking service, an instruction of start of forward/backward movement control, a notification of start of forward/backward movement control, or a notification of completion of vehicle withdrawal by forward/backward movement control, at the time of vehicle withdrawal. Furthermore, the main manager 21 receives, from the remote parking service, an instruction of start of forward/backward movement control, a notification of confirmation of a forward/backward movement control start condition, a notification of start of forward/backward movement control, or a notification of completion of vehicle storage by forward/backward movement control, at the time of vehicle storage. Each instruction or notification includes a value of ON or OFF. Furthermore, the main manager 21 receives a remote parking state from the remote parking service. In response, the main manager 21 feeds a notification of completion of start of forward/backward movement control, a notification of completion of getting-off of a driver in forward/backward movement control, a notification of response of a forward/backward movement control start condition, a notification of response of start of forward/backward movement control, or a notification of response of completion of vehicle storage by forward/backward movement control, at the time of vehicle storage, back to the remote parking service. Each notification includes a value of ON or OFF. Information to be fed back is obtained from the sub-managers 23a to 23d.

Furthermore, the main manager 21 receives, from the automatic driving service, an application request (including a value indicating start, wait, or end) for requesting setting of automatic wiper by automatic driving. Moreover, the main manager 21 transmits a notification that a reservation switch for remote parking is turned off, to a predetermined vehicle system.

FIG. 24 shows an example of the requests and notifications output from the main manager 21 to the sub-managers 23a to 23d (wiper sub-manager) in respect of the Fr wiper control shown as (H) of FIG. 3B.

As a result of control, the main manager 21 outputs an automatic wiper request (including a value of ON or OFF) for the existing wiper application to the wiper sub-manager. Furthermore, availability of an automatic driving state (automatic driving mode) is notified to the wiper sub-manager.

As described above, the main manager 21 can appropriately control the requests related to Fr wipers, which are individually received from the services, such as remote parking, and automatic driving, based on feedback information received from the sub-managers 23a to 23d (wiper sub-manager).

(9) Alarm Control

The main manager 21 performs alarm control based on requests received from the automatic driving service. FIG. 25 shows an example of the requests received by the main manager 21 from a service in respect of the alarm control.

The main manager 21 receives, from the automatic driving service, an application request (including a value indicating the presence or absence of a request) for requesting sounding of a horn when the main manager 21 detects that a driver has fallen into death or unconsciousness during the automatic driving mode, or a driver has inadvertently left the driving position (dead man detection).

FIG. 26 shows an example of the requests output from the main manager 21 to the sub-managers 23a to 23d (alarm sub-manager) in respect of alarm control shown as (I) of FIG. 3B. As a result of control, the main manager 21 outputs a request for requesting or stopping the sounding of the horn to the alarm sub-manager.

As described above, the main manager 21 can appropriately control the request related to the horn, which is received from the automatic driving service.

(10) Wireless Buzzer Control

The main manager 21 performs wireless buzzer control based on requests received from the in-vehicle child watching (rear seat leaving-alone notification) service. FIG. 27 shows an example of the requests received by the main manager 21 from a service in respect of the wireless buzzer control.

The main manager 21 receives, from the in-vehicle child watching (rear seat leaving-alone notification) service, an application request (including a value indicating the presence or absence of a request) for requesting sounding of a wireless buzzer when the main manager 21 detects that a child or the like is left alone at the rear seat.

FIG. 28 shows an example of the requests output from the main manager 21 to the sub-managers 23a to 23d (alarm sub-manager) in respect of the wireless buzzer control shown as (J) of FIG. 3B. As a result of control, the main manager 21 outputs a wireless buzzer sounding request (including a value indicating the presence or absence of a request) to the alarm sub-manager.

As described above, the main manager 21 can appropriately control the request related to the wireless buzzer, which is received from the automatic driving service.

Specific Examples of Control Process

A control process performed by the main manager 21 will be described with reference to FIGS. 29 to 37, by taking a hand chase lighting function as an example.

Figure 29:
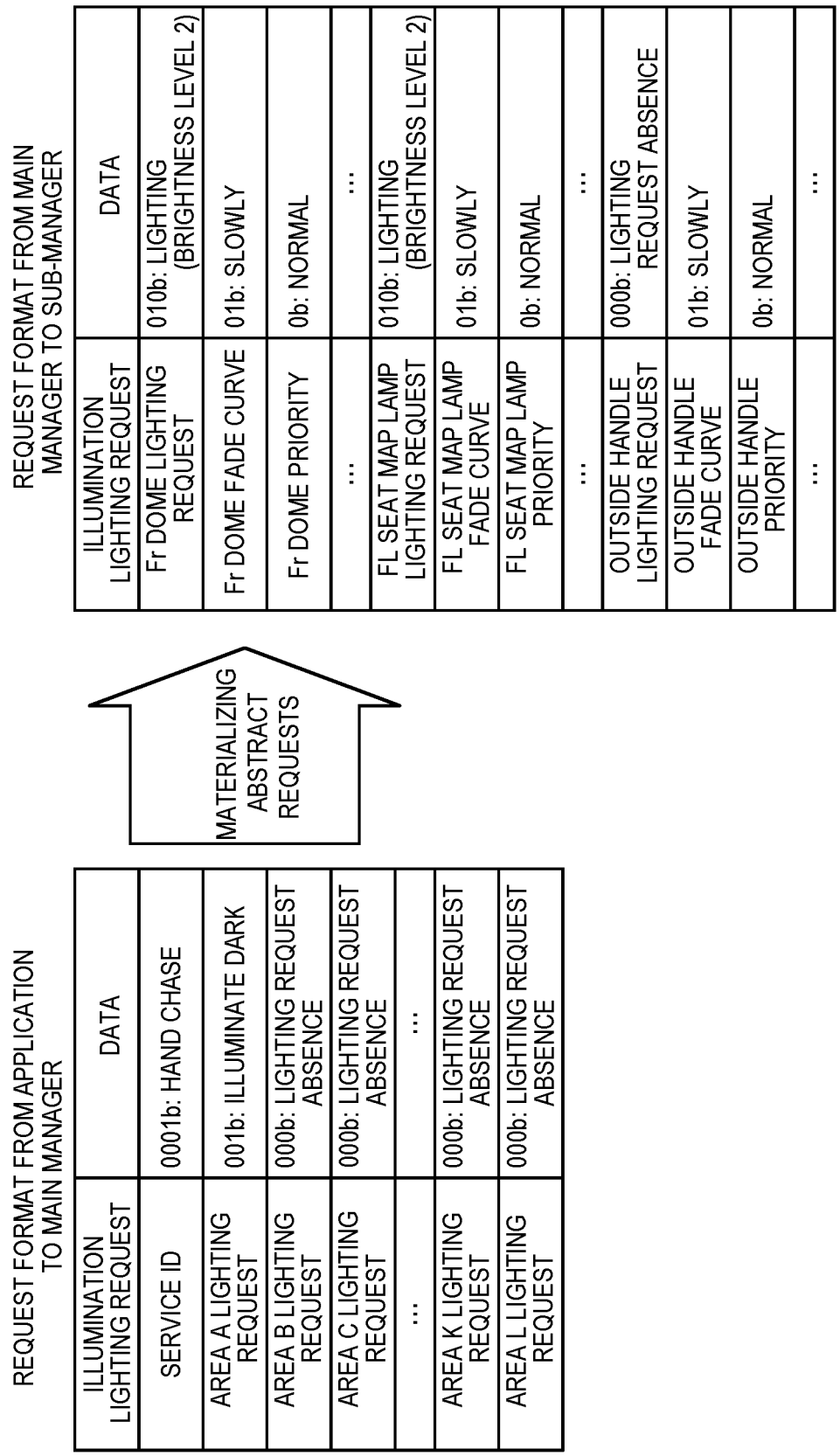
FIG. 29 is a diagram showing an example of a request format input and output by a main manager.
Figure 30:
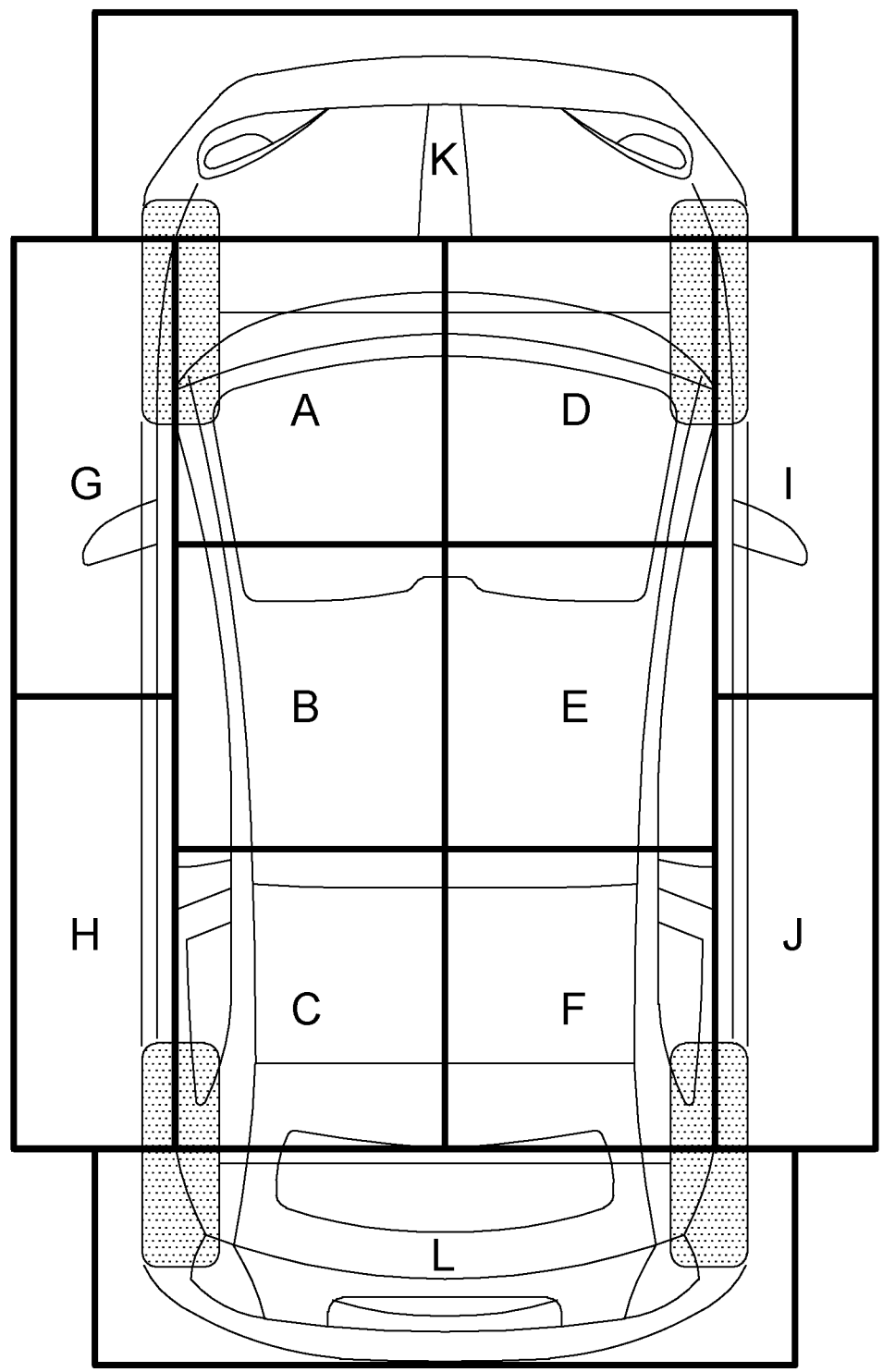
FIG. 30 is a diagram showing an example of areas formed inside and outside a vehicle.

The main manager 21 receives, from an application, such as an in-vehicle device automatic control (action recognition) service or the like, an abstract illumination lighting request relating to a hand chase lighting function shown in, for example, the left table of FIG. 29. In this illumination lighting request, "0001b: HAND CHASE" is designated as a service ID for specifying the hand chase lighting function. Furthermore, as for an illumination condition in each of areas A to L, which are divided as shown in FIG. 30 and located inside and outside a vehicle, for example, one of "000b: LIGHTING REQUEST ABSENCE" not lighting an illumination, "001b: ILLUMINATE DARK" requesting dark lighting of an illumination, and "101b: ILLUMINATE BRIGHT" requesting bright lighting of an illumination is designated. Then, the main manager 21 converts the abstract illumination lighting request into, for example, a concrete request for the sub-manager shown in the right table of FIG. 29. The concrete procedure will be described below.

First, the main manager 21 converts the area indicated in the illumination lighting request into a controllable illumination device by using a table for converting the areas into illumination devices to be controlled, which is illustrated in FIG. 31. In the example of FIG. 31, an Fr dome and an FL seat map lamp correspond to area A, an Rr dome and an RL seat map lamp correspond to area B, the Fr dome and an FR seat map lamp correspond to area D, an outside handle illumination corresponds to area J, and no illumination device corresponds to areas K and L.

Next, the main manager 21 materializes the illumination condition indicated in the illumination lighting request by using a table for converting the abstract lighting request into a concrete brightness level of an illumination device, which is illustrated in FIG. 32. More specifically, the main manager 21 specifies a level representing a control amount of an illumination device (such as an Fr dome, an FL seat map lamp, or the like) for realizing the request, based on the received illumination lighting request. In the example of FIG. 32, the levels are specified by converting "000b: LIGHTING REQUEST ABSENCE" received from the application into "000b: REQUEST ABSENCE" for the sub-manager, converting "001b: ILLUMINATE DARK" received from the application into "010b: LIGHTING (BRIGHTNESS LEVEL 2)" for the sub-manager, and converting "101b: ILLUMINATE BRIGHT" received from the application into "100b: LIGHTING (BRIGHTNESS LEVEL 4)" for the sub-manager. The brightness level is additional information of the lighting request. As an example, "4" may be set when the brightness is the highest, and "1" may be set when the brightness is the lowest.

Furthermore, the main manager 21 further materializes the illumination condition indicated in the illumination lighting request by using a table for converting the abstract lighting request into a fade function of an illumination device, which is illustrated in FIG. 33. In this fade curve conversion table, the optimum turning-on method is predefined for each service. In the example of FIG. 33, "0000b: ILLUMINATING HAND" received from the application is converted into "00b: NORMAL" for the sub-manager, "0001b: CHASING HAND" received from the application is converted into "01b: SLOWLY" for the sub-manager, and "0010b: ILLUMINATING HERE" received from the application is converted into "10b: FAST" for the sub-manager.

Furthermore, the main manager 21 specifies a priority of the illumination lighting request by using a table for determining the priority of the abstract lighting request, which is illustrated in FIG. 34. In the example of FIG. 34, the priority of "Ob: NORMAL (PRIORITY 3)" is set to any of "0000b: ILLUSTRATING HAND," "0001b: CHASING HAND," and "0010b: ILLUMINATING HERE" which are received from the application. The priority can be set by the main manager 21 for each service ID. For example, the highest priority may be set to "1," and the lowest priority may be set to "5." A plurality of priorities may be set for one service ID and used for different purposes in accordance with the conflicting requests.

The abstract illumination lighting request relating to the hand chase lighting function showing in the left table of FIG. 29 is converted into the materialized request for the illumination sub-manager shown in the right table of FIG. 29 by using the area control target conversion table (FIG. 31), the lighting request level conversion table (FIG. 32), the fade curve conversion table (FIG. 33), and the priority conversion table (FIG. 34).

Next, the main manager 21 performs control for determining a request to be output to the illumination sub-manager in respect of the materialized request for the sub-manager. Prior to the determination, the main manager 21 performs a process of grasping the equipping or non-equipping and the acceptability or non-acceptability for each area or illumination device to be controlled as shown in the table of FIG. 35, based on the equipping information on the ACTs/ECUs and the operation acceptability fed back from the illumination sub-manager. In the table of FIG. 35, for example, the area A is equipped with an illumination device, and both of lighting and lighting inhibition can be requested for the illumination device. The table shown in FIG. 35 is updated each time when information is fed back from the illumination sub-manager.

Then, the main manager 21 determines whether or not the request for the illumination sub-manager (the right table of FIG. 29) can be made, based on the information on the equipping or non-equipping and the acceptability or non-acceptability (FIG. 35) for each area or illumination device. The request in the example of the right table of FIG. 29 is a request for the lighting of the Fr dome and the FL seat map lamp. Therefore, the information on the equipping or non-equipping of the Fr dome and the FL seat map lamp and the acceptability or non-acceptability of the Fr dome and the FL seat map lamp is confirmed with reference to FIG. 35. In this example, both of the Fr dome and the FL seat map lamp are equipped and acceptable. Therefore, the main manager 21 determines that the request for the illumination sub-manager can be made as indicated by "⊚" in FIG. 36. For the request that indicates non-equipping or unacceptability, the request is rejected. Whether the request is absolute (⊚) or just recommended (○) may be appropriately set in units of request based on the priority and other predetermined parameters.

When a plurality of requests is determined to be capable of being made for the sub-manager, the main manager 21 performs a process of determining a request to be output to the sub-manager based on a predetermined rule. An example of the predetermined rule is a pre-defined rule in which a request with high priority is adopted for each ACT/ECU, a plurality of requests for the same ACT/ECU is adopted regardless of the priority, and a request with higher priority is adopted among a plurality of mutually exclusive requests.

FIG. 37 shows a situation in which five requests A to E determined to be capable of being made for the sub-manager are generated. The request A is, for example, a priority 3 request including a request for the illumination sub-manager according to the in-vehicle device automatic control (action recognition) service. The request B is, for example, a priority 1 request for the wiper sub-manager and the lid sub-manager according to the automatic driving service. The request C is, for example, a priority 2 request including a request for the wiper sub-manager according to the lane keep assist service. The request D is, for example, a priority 4 request including a request for the illumination sub-manager and the wiper sub-manager according to the in-vehicle child watching (device operation restriction) service. The request E is, for example, a priority 4 request including a request for the lid sub-manager according to the in-vehicle device automatic control (voice recognition) service. The priority can be specified from the service ID of the application request. A plurality of requests with the same request grouping number (ILL-1, ILL-2, WIP-3, and DLK-1) in FIG. 37 is exclusive requests.

In the situation where five requests A to E are generated as shown in FIG. 37, the main manager 21 first adopts the request B having priority 1. Next, the main manager 21 examines the request C having priority 2 and adopts the request C because the front wiper wiping request is the same as the front wiper wiping request of the adopted request B and does not conflict with other requests. Next, the main manager 21 examines the request A having priority 3 and also adopts the request A regardless of the priority because the request A does not conflict with the adopted requests B and C. On the other hand, the main manager 21 examines the request D having priority 4 and does not adopt the request D because the Fr dome lighting inhibition request and the FL seat map lamp lighting inhibition request are exclusive to the Fr dome lighting request and FL seat map lamp lighting request of the adopted request A. Furthermore, the main manager 21 examines the request E having priority 4 and does not adopt the request E because the door unlock request is exclusive to the door lock request of the adopted request B. Therefore, in this processing example, three requests, i.e., the request A, the request B, and the request C are adopted among the five requests A to E.

Furthermore, when a plurality of adopted requests is present for the same ACT/ECU as a result of the above-described processing, the main manager 21 determines which additional information of the request is to be selected. This determination is made based on the idea that the execution of a higher request can also satisfy a lower request. Thus, a level representing the amount of control of the ACT/ECU for covering and realizing a plurality of requests is specified. For example, in the case of adopting a Fr dome lighting request having brightness level 3 and a Fr dome lighting request having brightness level 5, it may be considered that the illumination at the brightness of brightness level 5 can also satisfy the brightness of brightness level 3. Therefore, brightness level 5 covering brightness level 3 is selected as the additional information. Moreover, for example, in the case of adopting the front wiper wiping request for Hi operation and the front wiper wiping request for Lo operation, it may be considered that the Hi operation of a front wiper can also satisfy the request for Lo operation from the viewpoint of securing forward visibility. Therefore, the Hi operation covering the Lo operation is selected as the additional information. When the front wiper wiping request is adopted as the requests B and C as shown in FIG. 37, for example, when the request B is the front wiper wiping request for Hi operation and the request C is the front wiper wiping request for Lo operation, it may be possible to adopt additional information of the request B for Hi operation that can satisfy the request for Lo operation.

Through the above-described processing, the main manager 21 processes a plurality of requests output from the first application execution units 11a to 11c, and determines requests for the sub-managers 23a to 23d. The processing result is sent back as a service ACK to the first application execution units 11a to 11c which are the request sources. The first application execution units 11a to 11c having received the processing result can monitor the execution status of the control processing, such as whether or not the ACT/ECU is operating based on the own request, whether or not the operation of the ACT/ECU has been completed, or the like, based on the processing result acquired from the main manager 21, and can determine change or cancellation of the control processing as needed. In addition, as the main manager 21 sends back the service ACK to the first application execution units 11a to 11c, it is possible to suppress increase in the amount of communication between the main manager 21 and the first application execution units 11a to 11c.

Figure 38A:
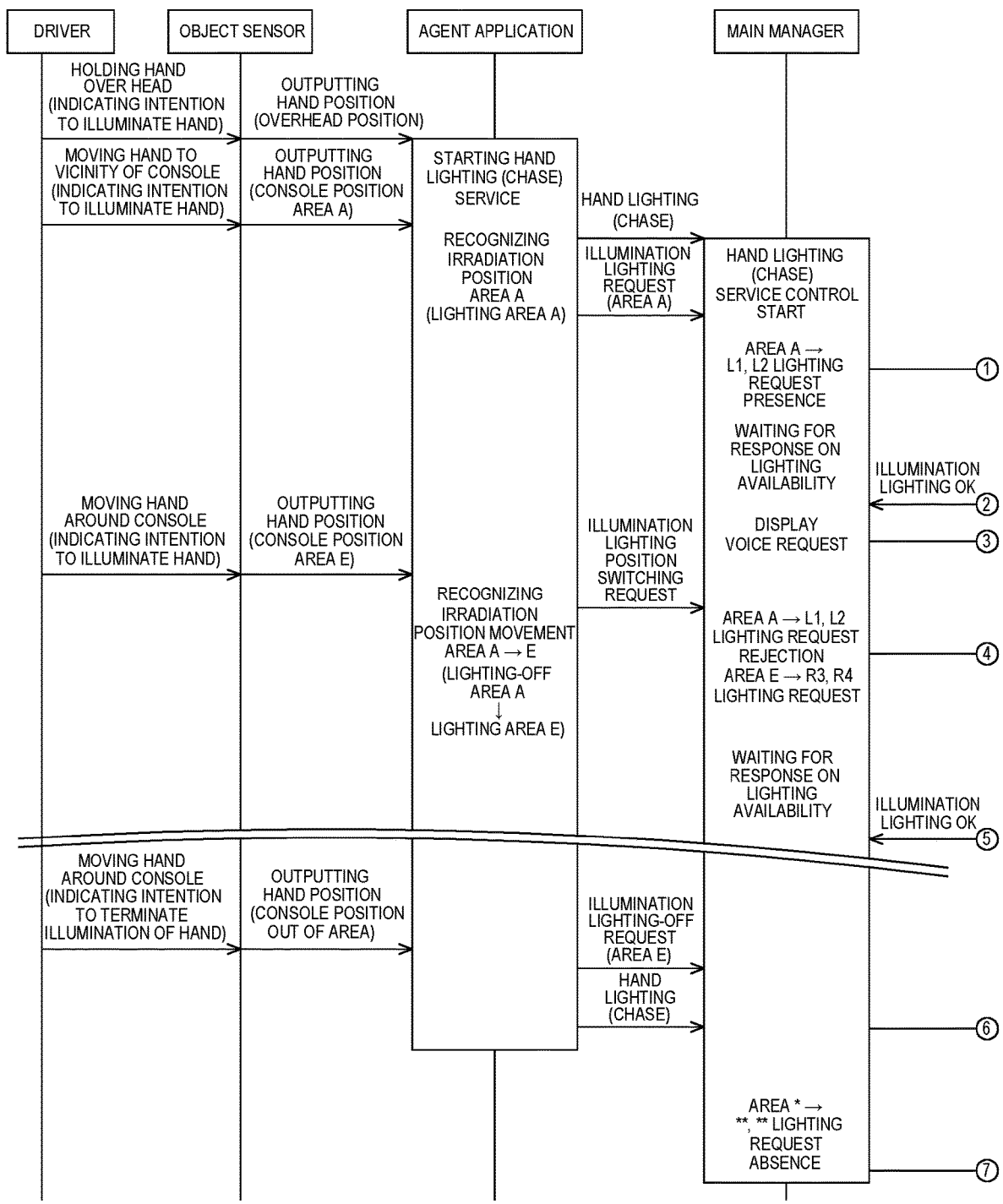
FIG. 38A is a diagram showing an example of a control sequence regarding a hand chase lighting process.
Figure 38B:
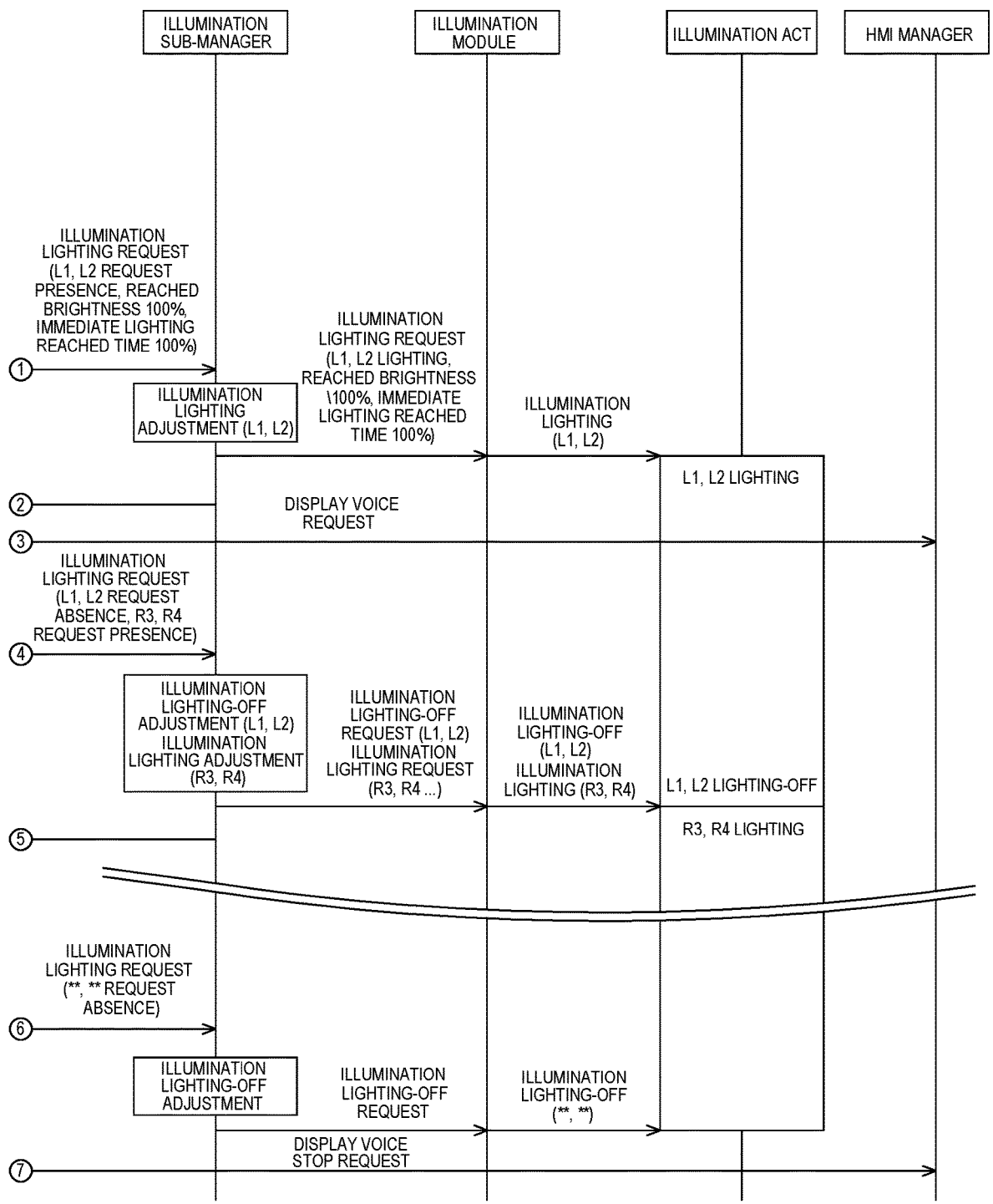
FIG. 38B is diagram showing an example of a control sequence regarding a hand chase lighting process.

FIGS. 38A and 38B show, as an example of the request A shown in FIG. 37, an example of a control sequence related to a hand chase lighting process realized by an agent application of the in-vehicle device automatic control (action recognition) service. The example of FIGS. 38A and 38B shows a case where the driver holds his or her hand over the head to indicate an intention to start the provision of a service for illuminating the hand. The agent application that has confirmed the driver's intention outputs a request for lighting of area A to the main manager. The main manager receives the request for lighting of area A from the agent application, processes a plurality of requests received from other services, such as automatic driving and the like, as shown in FIG. 37, and determines a final request to be output to the illumination sub-manager. Upon receiving the request for lighting of area A input from the main manager, the illumination sub-manager determines whether there is another request for lighting of area A from a illumination control application, and arbitrates a plurality of requests when there is another request. In the example of FIG. 37, the illuminations L1 and L2 are turned on via the illumination module because there is no other request. When the driver's hand moves from area A of a console to area E, the agent application outputs a request for lighting-off of area A and a request for lighting of area E to the main manager. Similarly, with respect to the request for lighting-off of area A and the request for lighting of area E received from the agent application, the main manager determines the conflict with other plural requests and determines a request to be output to the illumination sub-manager. Upon receiving a request for lighting-off of area A and a request for lighting of area E input from the main manager, the illumination sub-manager determines whether there is another request related to the lighting-off of area A and the lighting of area E from the illumination control application, and arbitrates a plurality of requests when there is another request. For example, when it is input from the illumination control application that a lighting button of an illumination L1 of area A is pressed by a vehicle occupant, the illumination sub-manager performs arbitration that gives priority to the occupant operation over the request from the main manager, and performs control to continue the lighting of area A. As described above, the main manager appropriately processes the hand chase lighting request made by the agent application until the driver indicates an intention to terminate the provision of a service for illuminating the hand, and the illumination sub-manager performs arbitration that gives priority to the illumination operation conducted by the vehicle occupant. Thus, two-step processing can be realized by the main manager and the sub-manager.

Operations and Effects

As described above, the vehicular arbitration system 1 according to an embodiment of the disclosure has a two-step processing structure that includes: the main manager 21 configured to receive requests from the first application execution units 11a to 11c and to determine a request for the sub-managers 23a to 23d; and the sub-managers 23a to 23d configured to arbitrate requests from the second application execution units 22a to 22g and the request determined by the main manager 21. With this structure, the main manager 21 does not have to process the requests from the second application execution units 22a to 22g. Therefore, when adding a new function to the vehicle, the function (service) expansion can be easily performed by merely adding an application for realizing the new function and a first application execution unit for executing the added application to the main manager 21. Thus, for example, the influence of the specification difference or the function difference between vehicles, such as the difference of the mounted first application execution units 11a to 11c and the like, can be absorbed by the control processing of the main manager 21 and, hence, does not affect the sub-managers 23a to 23d. Furthermore, for example, the influence of the specification difference or the function difference between vehicles due to the difference in the equipped ACTs/ECUs 31a to 31n is absorbed by the arbitration process of the sub-managers 23a to 23d and is provided to the main manager 21 as information. It is therefore possible to reduce the control processing load borne by the main manager 21.

Furthermore, with the vehicular arbitration system 1 according to the embodiment, the main manager 21 receives information including the state of the ACT/ECU fed back from the sub-managers 23a to 23d. Thus, new functions (services) realized by the first application execution units 11a to 11c and existing functions (services) realized by the second application execution units 22a to 22g can be controlled appropriately based on the information. This information includes, in addition to the current operation status of the ACT/ECU operated by the sub-manager, the equipping or non-equipping of the ACT/ECU that can be managed by the sub-manager, and the acceptability or non-acceptability of an operation by the equipped ACT/ECU. As a result, the request that cannot be processed can be excluded at the stage of processing performed by the main manager 21. It is therefore possible to reduce the arbitration load in the sub-managers 23a to 23d.

Furthermore, with the vehicular arbitration system 1 according to the embodiment, the main manager 21 gives priority to the request received from the first application execution units 11a to 11c, or specifies a level that represents the control amount of the ACT/ECU for realizing the request received from the first application execution units 11a to 11c. Thus, when the main manager 21 receives a plurality of requests from the first application execution units 11a to 11c, the main manager 21 can adopt one or more requests based on the priorities assigned to the plurality of requests. When the main manager 21 receives a plurality of mutually exclusive requests, the main manager 21 can adopt a request having high priority. When the main manager 21 receives a plurality of requests for the same ACT/ECU, the main manager 21 can adopt a level that represents the control amount of the ACT/ECU to cover and realize the plurality of requests. Thus, it is possible to perform optimal processing for a plurality of requests.

The disclosure is not only regarded as a vehicular arbitration system, but also may be regarded as a method executed by a computer of each system provided in the vehicular arbitration system, a program, a non-transitory computer-readable storage medium storing the program, or a vehicle equipped with the vehicular arbitration system.

The arbitration system of the disclosure is applicable to a vehicle that arbitrates requests from a plurality of applications to control an operation of the vehicle.

What is claimed is:

1. A vehicular arbitration system comprising:
   a manager configured to receive one or more first requests from a plurality of first applications and determine a second request based on the one or more received first requests and a predetermined rule, wherein
   the plurality of first applications are involved in a door lock control of a vehicle,
   the one or more first requests and the second request are related to the door lock control of the vehicle, and
   the manager is further configured to feed back information including a state of an in-vehicle device related to the vehicle door lock control to the plurality of first applications.

2. The vehicular arbitration system according to claim 1, wherein
   the second request is an unlatch non-permission request.

3. The vehicular arbitration system according to claim 1, wherein
   the second request is a door lock request.

4. The vehicular arbitration system according to claim 1, wherein
   the second request is a door unlock request.

5. A vehicular arbitration method of a vehicular arbitration system, the vehicle arbitration system including a manager and a plurality of first applications, the method comprising:
   receiving, by the manager, one or more first requests from the plurality of first applications;
   determining, by the manager, a second request based on the one or more first requests that are received and a predetermined rule, and
   feeding back, by the manager, information including a state of an in-vehicle device related to vehicle door lock control to the plurality of first applications, wherein
   the plurality of first applications are involved in the door lock control of a vehicle, and
   the one or more first requests and the second request are related to the door lock control of the vehicle.

6. A non-transitory storage medium storing instructions that are executable by one or more processors and that cause the one or more processors to perform functions comprising:
   receiving one or more first requests from a plurality of first applications;
   determining a second request based on the one or more first requests that are received and a predetermined rule, and
   feeding back information including a state of an in-vehicle device related to vehicle door lock control to the plurality of first applications, wherein
   the plurality of first applications are involved in the door lock control of a vehicle, and
   the one or more first requests and the second request are related to the door lock control of the vehicle.

* * * * *